US010750558B2

(12) United States Patent
Soriaga et al.

(10) Patent No.: US 10,750,558 B2
(45) Date of Patent: Aug. 18, 2020

(54) ULTRA-RELIABLE COMMUNICATIONS USING NEIGHBORING DEVICE-TO-DEVICE ASSISTANCE

(71) Applicant: QUALCOMM Incorporated, San Diego, CA (US)

(72) Inventors: Joseph Binamira Soriaga, San Diego, CA (US); Junyi Li, Chester, NJ (US); Tingfang Ji, San Diego, CA (US); Naga Bhushan, San Diego, CA (US); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 14/671,846

(22) Filed: Mar. 27, 2015

(65) Prior Publication Data

US 2016/0044733 A1 Feb. 11, 2016

Related U.S. Application Data

(60) Provisional application No. 62/034,284, filed on Aug. 7, 2014.

(51) Int. Cl.
*H04W 76/15* (2018.01)
*H04W 24/08* (2009.01)
(Continued)

(52) U.S. Cl.
CPC .......... *H04W 76/15* (2018.02); *H04L 1/1887* (2013.01); *H04W 24/08* (2013.01);
(Continued)

(58) Field of Classification Search
CPC ...... H04W 76/025; H04W 24/08; H04L 1/00; H04L 1/1887
See application file for complete search history.

(56) References Cited

U.S. PATENT DOCUMENTS 8,027,301 B2 9/2011 Oyman et al.
8,204,507 B2 6/2012 Yu et al.
(Continued)

FOREIGN PATENT DOCUMENTS

JP 2007124128 A 5/2007
JP 2011514109 A 4/2011
(Continued)

OTHER PUBLICATIONS

International Search Report and Written Opinion—PCT/US2015/042174—ISA/EPO—dated Nov. 16, 2015.

*Primary Examiner* — Kodzovi Acolatse
*Assistant Examiner* — Farhad Ali
(74) *Attorney, Agent, or Firm* — Linda G. Gunderson; Loza & Loza LLP

(57) ABSTRACT

One feature provides a method operational on a neighboring device for downlink transmission assistance for a target device. The neighboring device monitors a shared asynchronous first channel for broadcast transmissions from a serving access point. The neighboring device also determines if a received first transmission over the shared asynchronous first channel is intended for the target device. For instance, the received first transmission may be captured and decoded. After an expiration of a threshold period of time, the neighboring device relays the received first transmission to the target device over the first channel or a different second channel.

60 Claims, 15 Drawing Sheets

(51) Int. Cl.
  *H04L 1/18*    (2006.01)
  *H04W 88/04*   (2009.01)
  *H04W 76/18*   (2018.01)
  *H04W 76/40*   (2018.01)
  *H04L 1/00*    (2006.01)

(52) U.S. Cl.
  CPC ..... *H04L 2001/0097* (2013.01); *H04W 76/18* (2018.02); *H04W 76/40* (2018.02); *H04W 88/04* (2013.01)

(56) References Cited

U.S. PATENT DOCUMENTS

| | | | |
|---|---|---|---|
| 8,279,794 B2 | 10/2012 | Krishnaswamy | |
| 8,670,368 B2 * | 3/2014 | Chang | H04H 20/61 |
| | | | 370/315 |
| 8,804,677 B2 | 8/2014 | Corson et al. | |
| 9,444,587 B2 | 9/2016 | Agrawal et al. | |
| 2007/0070953 A1 | 3/2007 | Yoon et al. | |
| 2009/0262678 A1 | 10/2009 | Oyman et al. | |
| 2012/0076070 A1 * | 3/2012 | Takano | H04L 5/0005 |
| | | | 370/315 |
| 2013/0003678 A1 * | 1/2013 | Quan | H04W 72/04 |
| | | | 370/329 |
| 2013/0077558 A1 * | 3/2013 | Ukita | H04W 16/26 |
| | | | 370/315 |
| 2013/0135988 A1 | 5/2013 | Kim et al. | |
| 2014/0119223 A1 | 5/2014 | Song et al. | |
| 2014/0171062 A1 | 6/2014 | Fallgren et al. | |
| 2014/0177456 A1 | 6/2014 | Boudreau et al. | |

FOREIGN PATENT DOCUMENTS

| | | |
|---|---|---|
| WO | 2007082035 A2 | 7/2007 |
| WO | 2010036276 A2 | 4/2010 |
| WO | 2010044808 | 4/2010 |

* cited by examiner

ULTRA-RELIABLE COMMUNICATIONS USING NEIGHBORING DEVICE-TO-DEVICE ASSISTANCE

CLAIM OF PRIORITY

The present application for patent claims priority to provisional application No. 62/034,284 entitled "Ultra-Reliable Communications Using Neighboring Device-to-Device Assistance" filed Aug. 7, 2014, the entire disclosure of which is hereby expressly incorporated by reference.

FIELD

Various features relate to communication devices and methods for facilitating highly reliable or ultra-reliable communications to a target mobile device by having at least one neighboring or nearby device assist in relaying uplink and downlink transmission between a network access point and the target mobile device.

BACKGROUND

Mobile communication devices typically communicate over wireless networks and through network (serving) access points (e.g., Evolved Universal Terrestrial Radio Access Network (E-UTRAN) Node Bs, or evolved Node Bs, or eNBs). Different services (e.g., data, voice, video, etc.), may have different quality of service or connection reliability requirements. A highly-reliable and/or ultra-reliable connection is difficult to maintain between a network (or serving) access point and a target mobile device. For instance, the movement of the target mobile device, environmental conditions, geographical or building obstructions, etc., may cause loss of signal quality in the connection or link between the network access point and the target mobile device. Some scenarios that may cause loss of signal quality can include, e.g., fading, the attenuation of signal quality over certain propagation media, or shadowing, where large obstructions obscure the main signal path between the transmitter and the receiver.

One solution to address such signal quality loss may involve time diversity of transmissions, which can increase latency. Another solution to address such signal quality loss may involve frequency diversity of transmissions. Using this approach, all devices (e.g., service access points, such as eNBs, and mobile devices, also referred to as user equipment or UE) should be able to operate across different frequency spectrums, bands and/or carriers. Yet another solution to address such signal quality loss may involve spatial diversity of transmissions. This approach generally requires the service access points and/or mobile devices to be equipped with a plurality of antennas.

SUMMARY

One feature provides a method operational on a neighboring device for downlink transmission assistance for a target device. The neighboring device monitors a shared asynchronous first channel for broadcast transmissions from a serving access point. The neighboring device also determines if a received first transmission over the shared asynchronous first channel is intended for the target device. For instance, the received first transmission may be captured and decoded. After an expiration of a threshold period of time, the neighboring device relays the received first transmission to the target device over the first channel or a different second channel.

According to one aspect, the first channel and the second channel are established over different non-overlapping frequency spectrums. According to another aspect, the first channel is coextensive with the second channel.

The threshold period of time may be synchronous with respect to reception of the first transmission. In some implementations, the received first transmission may be automatically relayed after a decoding delay.

According to one aspect, the received first transmission is relayed only if a failure indicator is received from the target device. According to another aspect, the received first transmission is relayed in synchronicity with an expected retransmission from the serving access point.

According to one aspect, the first channel uses a first frequency spectrum, a first communication protocol, and/or a first modulation-and-coding scheme. According to another aspect, the method also includes receiving a message from the target device over the second channel indicating that a retransmission of the received first transmission is desired over the second channel, the second channel using a second frequency spectrum, a second communication protocol, and/or a second modulation-and-coding scheme, distinct from the first channel. According to yet another aspect, the received first transmission is relayed within an expected transmission time interval of transmissions over the first channel.

According to one aspect, the first transmission is relayed regardless of channel conditions for the first channel and/or the second channel. According to another aspect, the first channel is shared for all broadcast transmissions from the serving access point.

Another feature provides a method operational on at least one neighboring device for uplink transmission assistance for a serving access point. The neighboring device receives a first transmission from a target device over a shared asynchronous first channel for broadcast transmissions. The first transmission is also sent from the target device to the serving access point. An additional time period is pre-allocated by the serving access point. The neighboring device determines if the first transmission was not received by the serving access point. After an expiration of the pre-allocated additional time period, the neighboring device relays the received first transmission to the serving access point over the shared asynchronous first channel or a different second channel.

According to one aspect, the method also includes receiving a second transmission from the target device over the shared asynchronous first channel for broadcast transmissions, the second transmission not being sent to the serving access point. The method also includes simultaneously broadcasting, to the serving access point, both the received second transmission and a third transmission from the target device over the shared asynchronous first channel or the different second channel, the second transmission and the third transmission being the same transmission.

According to one aspect, all devices that send transmissions use the same time and/or frequency resources to form a local single frequency network.

According to one aspect, the serving access point selects the relaying of the received first transmission to be unicasted from several nearby additional devices capable of relaying transmissions.

According to one aspect, the first transmission not received by the serving access point includes determining if the serving access point sends a failure indicator (NAK) that is received by at least the target device.

DRAWINGS

DETAILED DESCRIPTION

Figure 1:
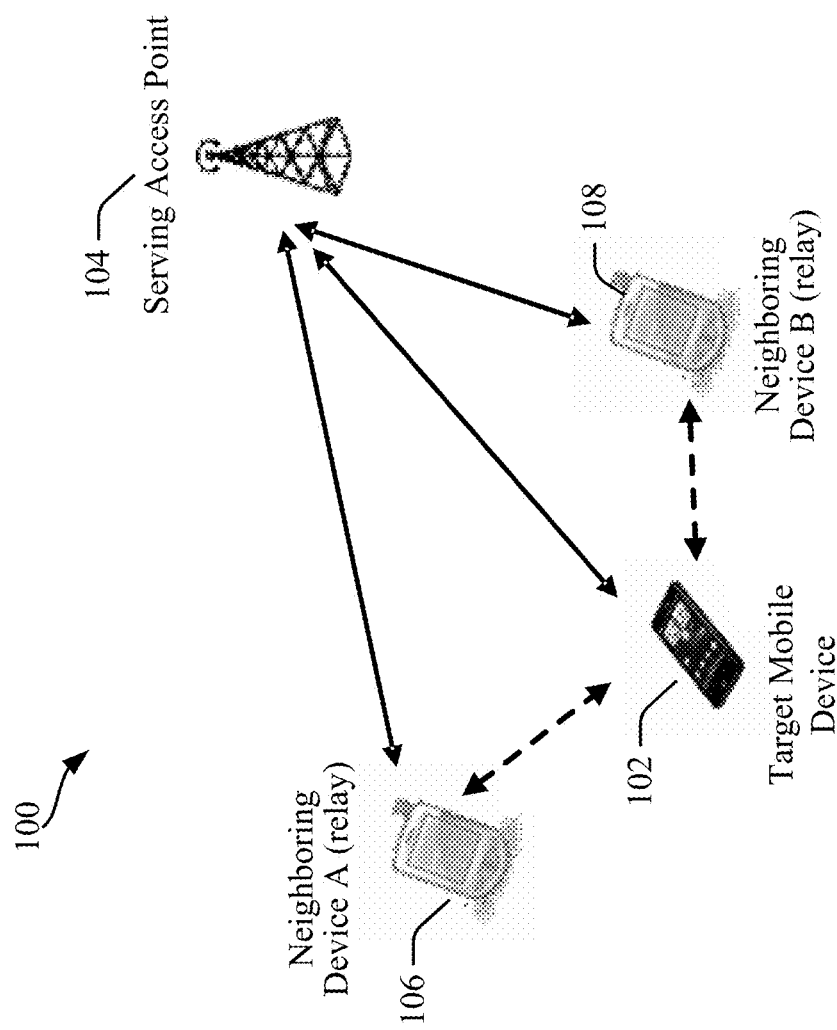
FIG. 1 is a block diagram illustrating an exemplary wireless network in accordance with some aspects of the disclosure.

In the following description, specific details are given to provide a thorough understanding of the embodiments. However, it will be understood by one of ordinary skill in the art that the embodiments may be practiced without these specific detail. For example, circuits may be shown in block diagrams in order avoid obscuring the embodiments in unnecessary detail. In other instances, well-known circuits, structures and techniques may not be shown in detail in order not to obscure the embodiments.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation.

Overview

Improved link reliability between a serving access point (e.g., Evolved Universal Terrestrial Radio Access Network (E-UTRAN) Node B, or evolved Node B, or eNB) and a target mobile device (e.g., also known as user equipment or UE) may be achieved with device-to-device relaying from neighboring devices (e.g., between neighboring UEs to the target mobile device). In the downlink direction from a serving access point to a target mobile device, relaying neighboring devices may transmit or relay the same message (sent by the serving access point) to the target mobile device, thereby producing a local single frequency network. Similarly, in the uplink direction, from the target mobile device to the serving access point, the neighboring devices can retransmit or relay the same message (sent by the target mobile device) to the serving access point. This approach in the uplink direction provides alternative signal propagation paths that connect a service access point and a target mobile device through one or more devices neighboring or close to the target mobile device. Because the one or more devices may have better channel conditions with the serving access point compared to the target mobile device, the one or more devices are able to provide much higher reliability versus the direct connection/link between the mobile target device and the serving access point.

According to one aspect, a different link may be used for relaying downlink transmissions to a target device than is used to transmit from the serving access point to the target device. For instance, the target device may be adapted to receive a first transmission from a serving access point over a first link and, upon a failure to decode the first transmission, the target device may request a retransmission of the first transmission over a second link. A neighboring device may be adapted to receive the request for a retransmission of the first transmission over the second link. The neighboring device then relays the first transmission to the target device over the second link. The first link may use a first frequency spectrum, a first communication protocol, and/or a first modulation-and-coding scheme, while the second link may use a second frequency spectrum, a second communication protocol, and/or a second modulation-and-coding scheme, distinct from the first link.

Exemplary Operating Environment

FIG. 1 is a block diagram illustrating an exemplary wireless network 100. The exemplary wireless network 100 may include a target mobile device 102, a serving access point 104, and two neighboring devices 106 and 108. The serving access point 104 may provide wireless service to devices within a given region that may be defined by sectors. In this example, a shared frequency spectrum may be used by the serving access point 104 to communicate with all the devices 102, 106, and 108. Consequently, all downlink transmissions (e.g., broadcasted by the serving access point to the devices) and uplink transmissions (e.g., broadcasted by the target mobile device and/or neighboring devices to the serving access point) can be captured or received by all other devices within the served region.

In one example, each device 102, 106, and 108 served by the serving access point 104 may have an allocated channel (e.g., defined by a timeslot, scrambling code, etc.) on which it receives and/or sends transmissions. However, because a shared frequency spectrum is used for all transmissions by the serving access point 104, the devices 102, 106, 108 are able to listen on transmissions to/from other devices because they are within range. In conventional systems, a given device ignores transmissions not intended for it (e.g., the device does not decode transmissions not intended for it, or not in its allocated channel). By contrast, in the present exemplary wireless network 100, the served devices 102, 106, 108 may be configured or dynamically adjusted (e.g., by the serving access point 104, etc.) to listen to and decode some or all transmissions (whether intended for the device or for another device). In one implementation, the shared channels for broadcast transmissions from the serving access point are asynchronous. Asynchronous channels may transmit data without the use of an external clock signal, which allows the data to be transmitted in portions or intermittently, instead of in a constant or steady stream.

When configured to relay transmissions, the neighboring devices 106 and 108 may capture all transmissions between the serving access point 104 and the intended target mobile device 102, decode the transmissions, and relay or forward the decoded transmissions in the uplink and/or downlink directions.

Exemplary Downlink Device-to-Device Assistance

Figure 2:
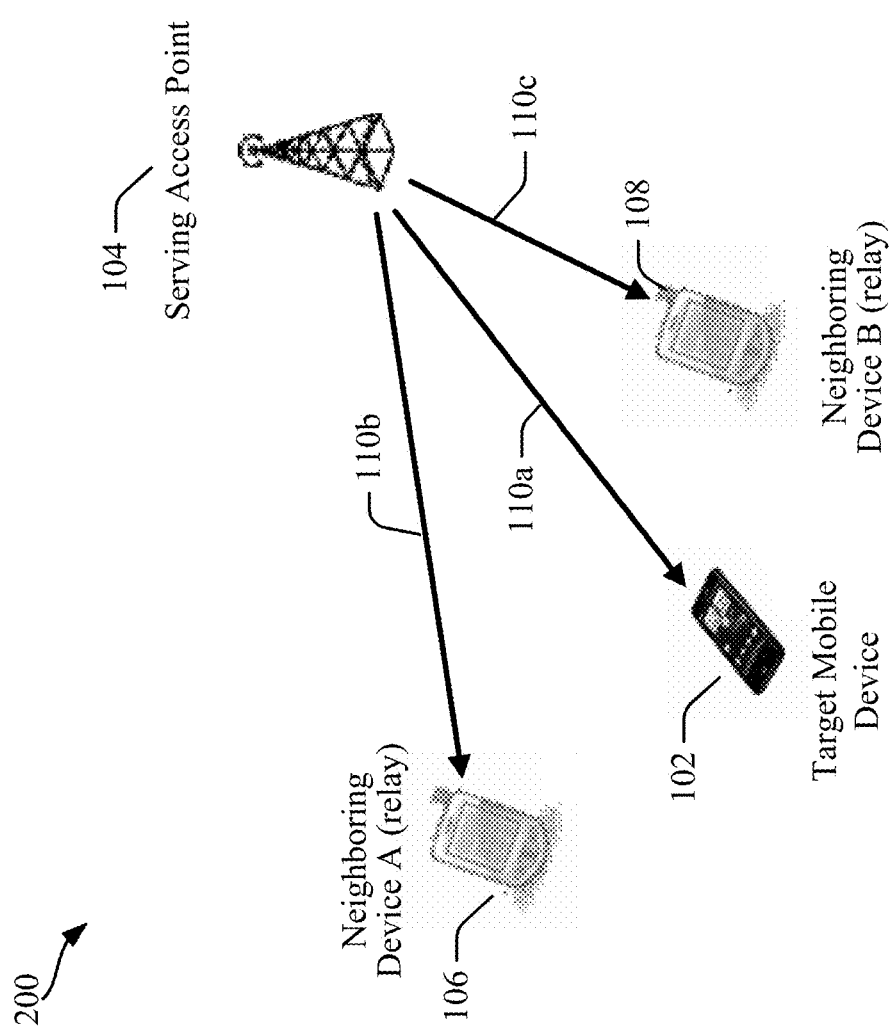
FIG. 2 is a block diagram illustrating downlink assistance in the exemplary wireless network in which neighboring devices capture transmissions from the serving access point intended for the target mobile device in accordance with some aspects of the disclosure.

FIG. 2 is a block diagram illustrating downlink assistance in the exemplary wireless network 100 of FIG. 1 in which neighboring devices capture transmissions from the serving access point 104 intended for the target mobile device 102. A downlink transmission 110a may be sent by the serving access point 104 to the intended recipient, the target mobile device 102. The downlink transmission 110a may be for broadcast, control, or data transmissions.

In this example, the target mobile device 102 receives the downlink transmission 110a. The neighboring devices 106 and 108 may also be configured to receive the downlink transmissions 110b and 110c, respectively, decode the downlink transmission 110b and 110c (e.g., to ascertain the intended recipient), and may buffer and/or temporarily store the received downlink transmission 110b and 110c for subsequent relaying or retransmission to the target mobile device 102, for example. In one implementation, a shared channel for broadcast transmissions from the serving access point may be asynchronous.

This shared asynchronous first channel may be monitored to determine if a received first transmission over the shared asynchronous first channel is intended for the target mobile device 102. The received first transmission may be relayed after the expiration of a threshold period of time to the target device over the shared asynchronous first channel or a different second channel.

Figure 3:
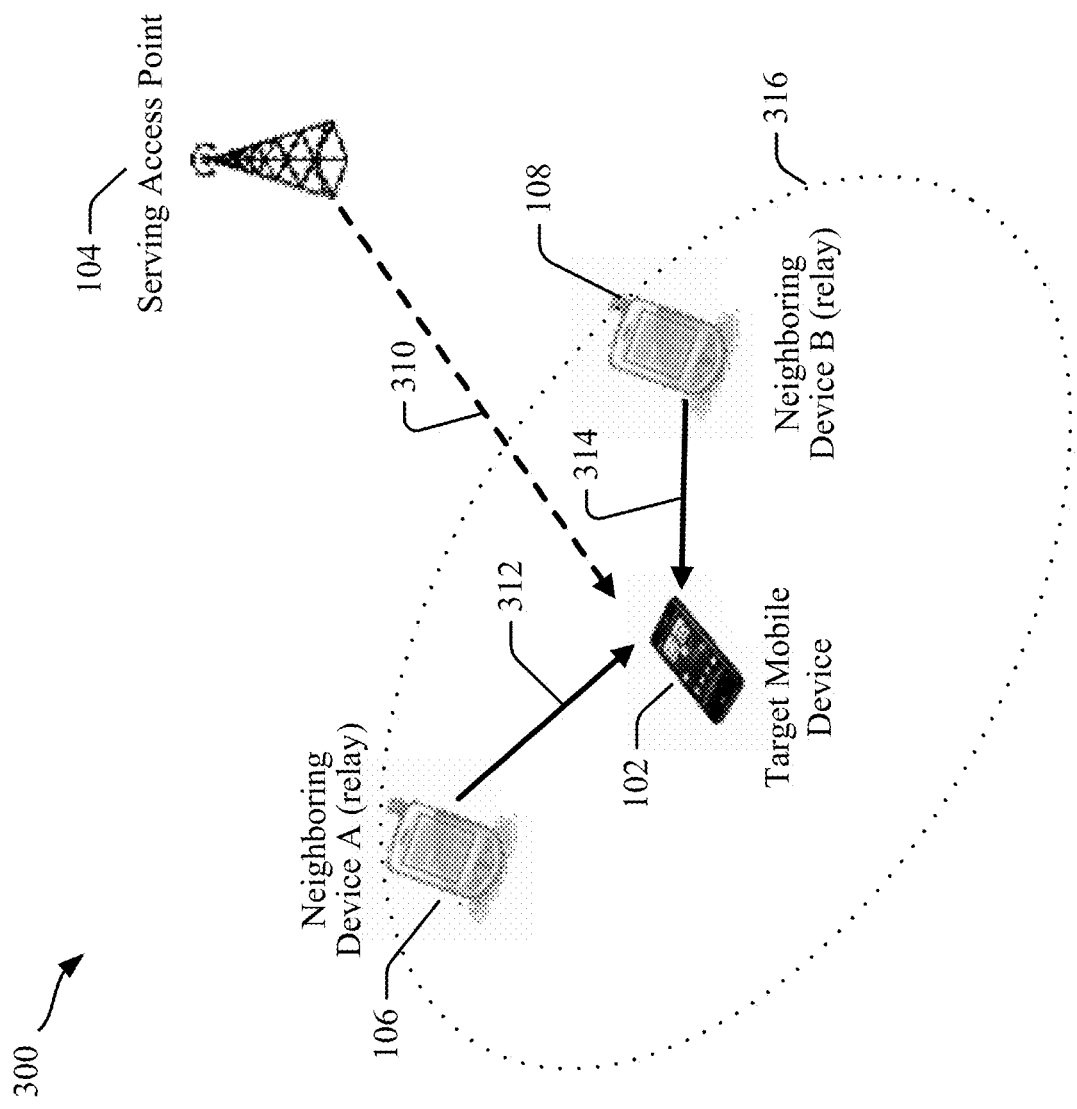
FIG. 3 is a block diagram illustrating downlink assistance in the exemplary wireless network in which neighboring devices retransmit or relay previously captured transmissions from the serving access point intended for the target mobile device in accordance with some aspects of the disclosure.

FIG. 3 is a block diagram illustrating downlink assistance in the exemplary wireless network 100 in which neighboring devices 106 and 108, respectively, retransmit or relay individual relay signals 312 and 314 from the serving access point 104 intended for the target mobile device 102. In this example, the neighboring devices 106 and 108 may relay the relay signals 312 and 314 which are essentially the previously captured transmissions 110b and 110c to the target mobile device 102. In one implementation, the relaying of the relay signals 312 and 314 occurs only after the expiration of a threshold period of time.

Prior to relaying the relay signals 312 and 314 of the transmission to the target mobile device 102, the neighboring devices 106 and 108 may either ascertain whether the target mobile device 102 is nearby (e.g., within a local region 316 based on the signal strength of transmissions from the target mobile device 102) or may be instructed (e.g., by the serving access point 104) to relay transmissions to the target mobile device 102.

The relayed transmissions of the relay signals 312 and 314 may serve to create a single frequency network (SFN) in which several transmitters simultaneously send the same signal over the same frequency channel. The target mobile device 102 may then combine the received transmissions to extract the transmitted signal.

According to one aspect, the relay transmissions of the relay signals 312 and 314 may reuse the same frequency or channel used by the serving access point 104 when being transmitted to the target mobile device 102. Alternatively, the relay transmissions of the relay signals 312 and 314 may be on a different frequency or channel (e.g., a Wifi channel) that is distinct and/or separate from frequency or channel used by the serving access point 104, e.g., a separate uplink channel from the neighboring devices 106 and 108 to the target mobile device 102, in order to transmit to the target mobile device 102. In one implementation, the retransmission time/frequency resources used for the relay signals 312 and 314 may be requested or pre-allocated.

According to one feature, the access point 104 may be aware of the neighboring device 106 and 108 relaying feature and may time/synchronize its own retransmission 310 to coincide with such relay signals 312 and 314 to improve SFN performance. In one implementation, the relay signals 312 and 314 may be relayed after the expiration of a threshold period of time.

In one example, the target mobile device 102 may send a request for re-transmission from the neighboring devices 106 and 108 or from the serving access point 104 by using a local negative acknowledgment (NAK) message. In one example, the request for retransmission may be sent to the serving access point 104, which may then command neighboring devices 106 and 108 to relay the previously captured transmission to the target mobile device 102.

When the serving access point 104 commands neighboring devices 106 and 108 to relay signals, a few embodiments are possible. For example, the serving access point 104 may ask all the devices in the cell or region to relay signals, and may allocate a specific time and frequency channel resource for the relay transmissions. As another example, the access point 104 may ask a subset of the devices to relay. Prior to that, the serving access point 104 may acquire the knowledge of what devices are close to (i.e., neighboring) the target mobile device 102. For example, there may be a discovery time period in which devices discover nearby devices. The neighboring devices A 106 and B 108 may report to the serving access point 104 that they are close to the target mobile device 102 such that when the access point 104 needs assistance, it selects neighboring devices A 106 and B 108 to relay signals to.

In various implementations, the target mobile device 102 may be within a coverage region of the serving access point 104 or out of the coverage region of the serving access point 104.

Figure 4:
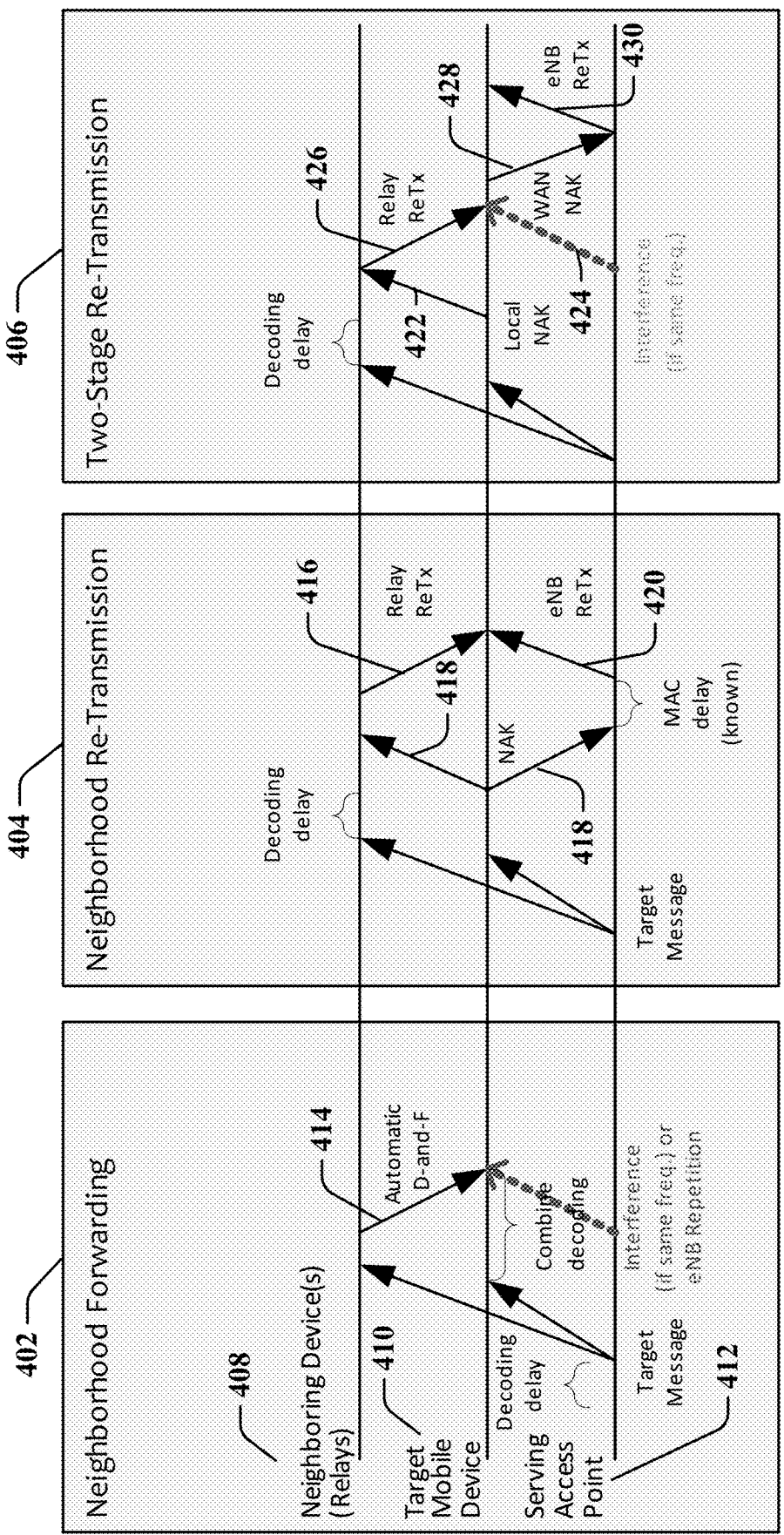
FIG. 4 illustrates three downlink relaying scenarios in accordance with some aspects of the disclosure.

FIG. 4 illustrates three downlink relaying scenarios.

In a first downlink relaying scenario 402, the neighboring devices 408 relay a transmission 414 intended for the target mobile device 410 as soon as it is able to decode the transmission and is able to identify its recipient (e.g., decode and forward operation).

In a second downlink relaying scenario 404, the neighboring devices 408 relay a transmission 416 intended for the target mobile device 410 after it has received an indicator (NAK) 418 that a retransmission is desired. Note that the serving access point 412 may also send a retransmission 420 upon receipt of the indicator (NAK).

In a third downlink relaying scenario 406, the target mobile device 410 may send a local indicator (NAK) 422 to seek retransmissions 426 from local or neighboring devices first. The target mobile device 410 may send a second indicator (WAN NAK) 428 to seek retransmissions 430 from the serving access point 412. The second indicator 428 sent from the target mobile device 410 may be triggered by the transmission of interference 424 to the target mobile device 410 from the serving access point 412.

In an alternative fourth scenario (not shown), the neighboring devices need not proactively decode every transmission that is intended for the target mobile device. Instead, the serving access point may first transmit to the target mobile device in a unicast manner, e.g., using a regular unicast identifier. Then, when downlink assistance is used for the target mobile device, e.g., because of a failed transmission, the serving access point may indicate to all neighboring devices to receive and decode some specific transmission, e.g., using a special grant identifier. The neighboring devices will decode the transmission from the serving access point and relay to the target mobile device only upon receiving the indication from the serving access point.

Figure 5:
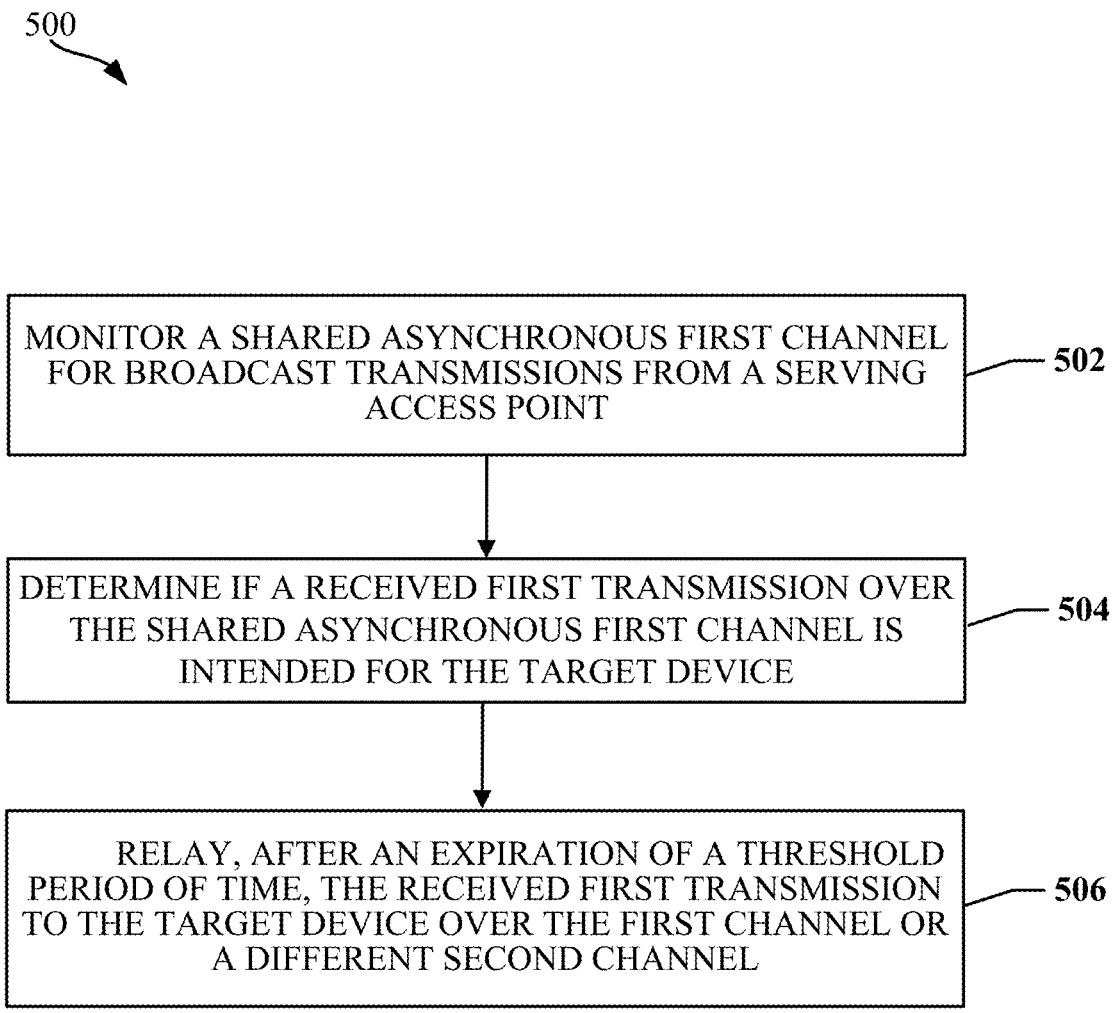
FIG. 5 illustrates an exemplary method operational on a neighboring device for downlink transmission assistance for a target device in accordance with some aspects of the disclosure.

FIG. 5 illustrates an exemplary method 500 operational on at least one neighboring device (e.g., devices 106 or 108 of FIGS. 1-3) for downlink transmission assistance for a target device.

The at least one neighboring device monitors a shared asynchronous first channel for broadcast transmissions from a serving access point 502. The at least one neighboring device may then determine if a received first transmission over the shared asynchronous first channel is intended for the target device 504. The received first transmission may then be relayed, after the expiration of a threshold period of time, to the target device over the shared asynchronous first channel or a different second channel 506.

In one example, the shared asynchronous first channel and the second channel are established over different non-overlapping frequency spectrums.

In another example, the shared asynchronous first channel is coextensive with the second channel.

In yet another example, the threshold period of time is synchronous with respect to reception of the first transmission. That is, both the threshold period of time and the reception of the first transmission are governed by the same clock.

In yet another example, the method also includes capturing and decoding the received first transmission. In yet another example, the method also includes automatically relaying the received first transmission after a decoding delay.

In yet another example, the received first transmission is relayed only if a failure indicator is received from the target device.

In yet another example, the received first transmission may be relayed in synchronicity with an expected retransmission from the serving access point.

In yet another example, the first channel uses a first frequency spectrum, a first communication protocol and/or a first modulation-and-coding scheme.

In yet another example, the method also includes receiving a message from the target device over the second channel indicating that a retransmission of the received first transmission is desired over the second channel, wherein the second channel uses a second frequency spectrum, a second communication protocol, and/or a second modulation-and-coding scheme, distinct from the first channel.

In yet another example, the received first transmission is relayed within an expected transmission time interval of transmissions over the first channel.

In yet another example, the first transmission is relayed regardless of channel conditions for the first channel and/or the second channel.

In yet another example, the first channel is shared for all broadcast transmissions from the serving access point.

Exemplary Uplink Device-to-Device Assistance

Figure 6:
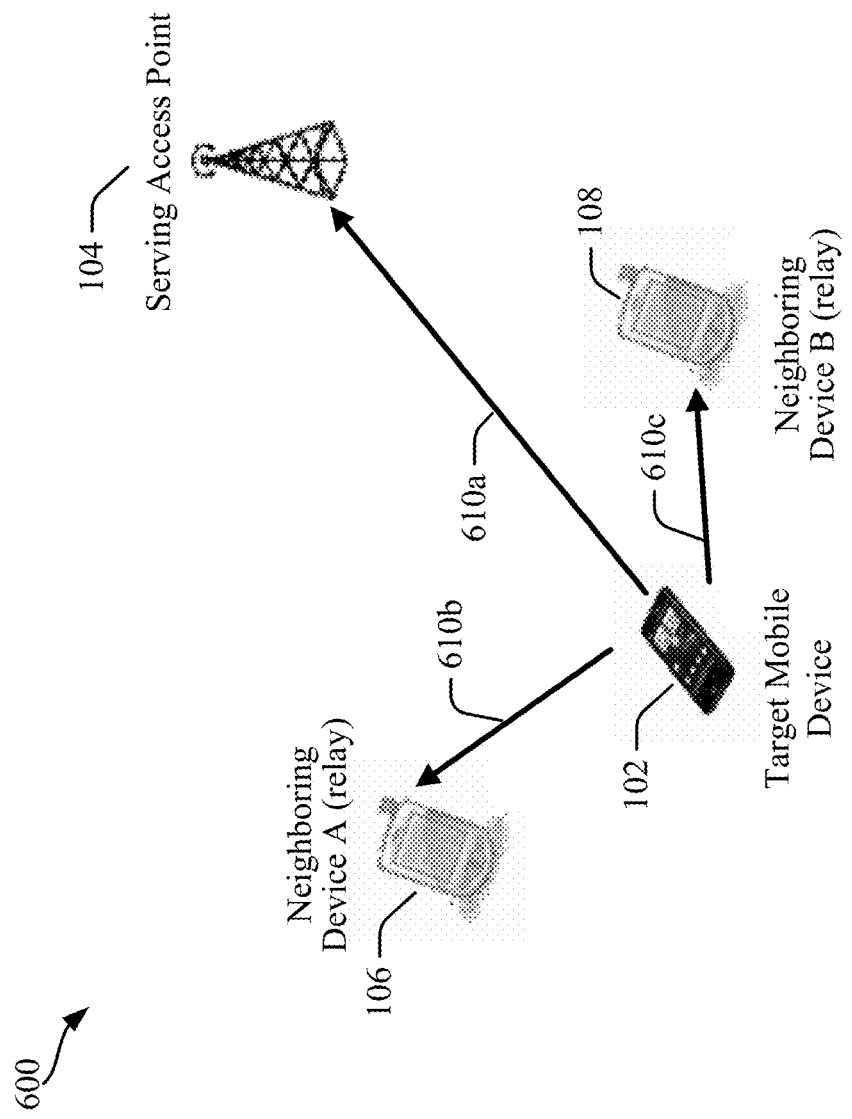
FIG. 6 illustrates a first part of a first relaying scheme where the serving access point is aware of relaying functionality of the neighboring devices in accordance with some aspects of the disclosure.

FIG. 6 is a block diagram illustrating uplink assistance in the exemplary wireless network 100 in which neighboring devices capture transmissions from the target mobile device 102 intended for the serving access point 104. An uplink transmission 610 (610*a*, 610*b*, 610*c*) may be sent by the target mobile device 102 to the intended recipient, the serving access point 104. The uplink transmission 610 (610*a*, 610*b*, 610*c*) may be for broadcast, control, or data transmissions. Only part 610*a* of the uplink transmission 610 may be completely transmitted from the target mobile device 102 to the serving access point 104. This part 610*a* may not be completely transmitted from the target mobile device 102 to the serving access point 104 during a decoding failure.

Figure 7:
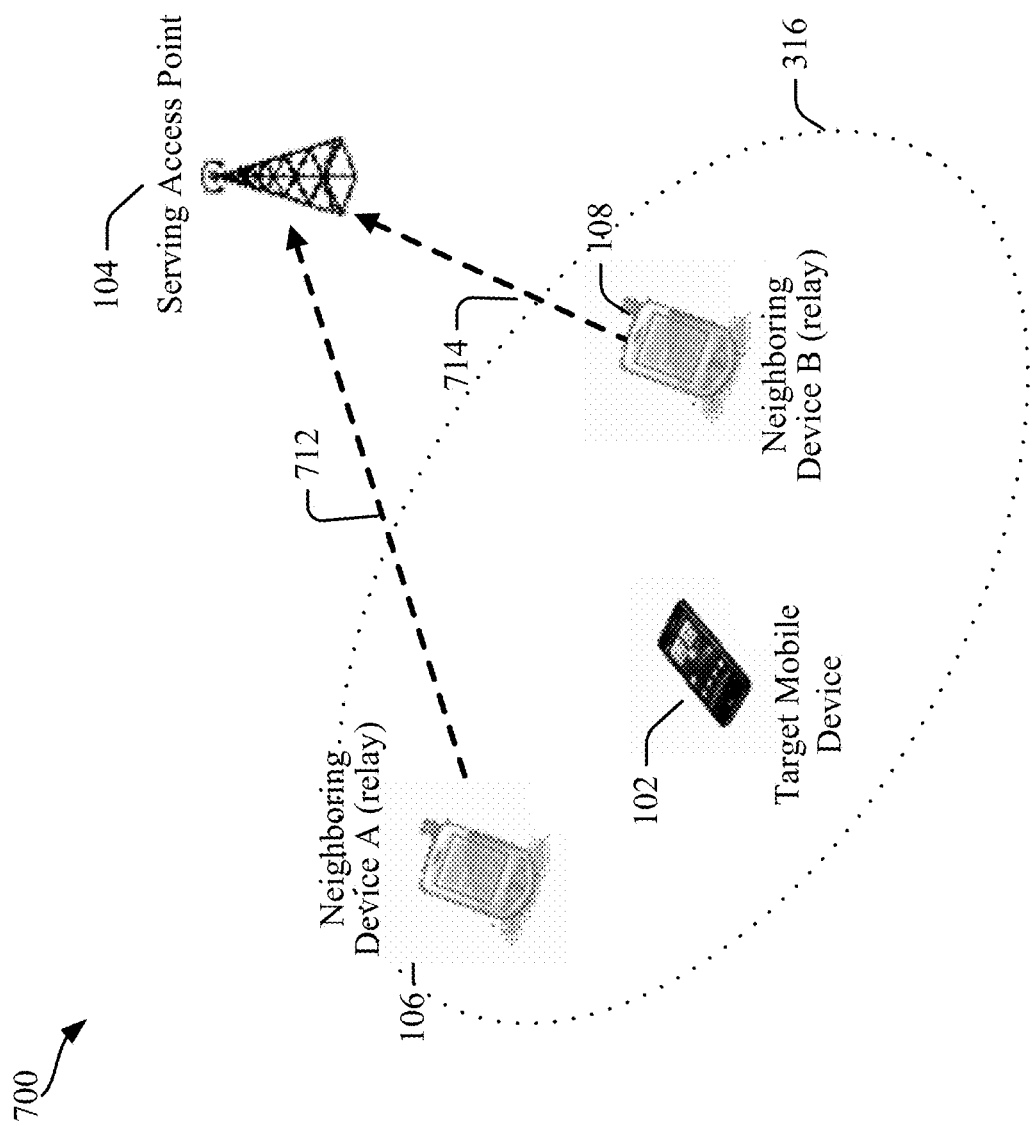
FIG. 7 illustrates a second part of the first relaying scheme where the serving access point is aware of relaying functionality of the neighboring devices in accordance with some aspects of the disclosure.

FIGS. 6 and 7 illustrate a first relaying scheme where the serving access point 104 is aware of the relaying functionality of the neighboring devices 106 and 108. The serving access point 104 may pre-allocate additional time resources for the neighboring devices 106, 108 to forward messages from the target mobile device 102 to the serving access point 104. Alternatively, upon a decode failure at the serving access point 104, the serving access point 104 may request at least the neighboring devices 106 and 108 to respectively relay at least relay signals 712 and 714 (FIG. 7) representing the failed transmission from the target mobile device 102. Here, all sender, sending devices, or devices that send transmissions may use the same time and/or frequency resources to form a local single frequency network.

Alternatively, the serving access point 104 may select a relay to be unicasted (from among several nearby additional devices capable or able to relay a transmission). A first transmission from the target mobile device 102 may be sent to the neighboring devices 106, 108 and to the serving access point 104 over a shared asynchronous first channel for broadcast transmission. The serving access point pre-allocates an additional time period to forward transmissions from the target mobile device 102, received by the neighboring devices 106, 108, to the serving access point 104. If this first transmission was not received by the serving access point 104, then the received first transmission (by the neighboring devices 106, 108) may be relayed from the neighboring devices 106, 108 to the serving access point 104 over the shared asynchronous first channel or a different second channel after the expiration of the pre-allocated time period.

Figure 8:
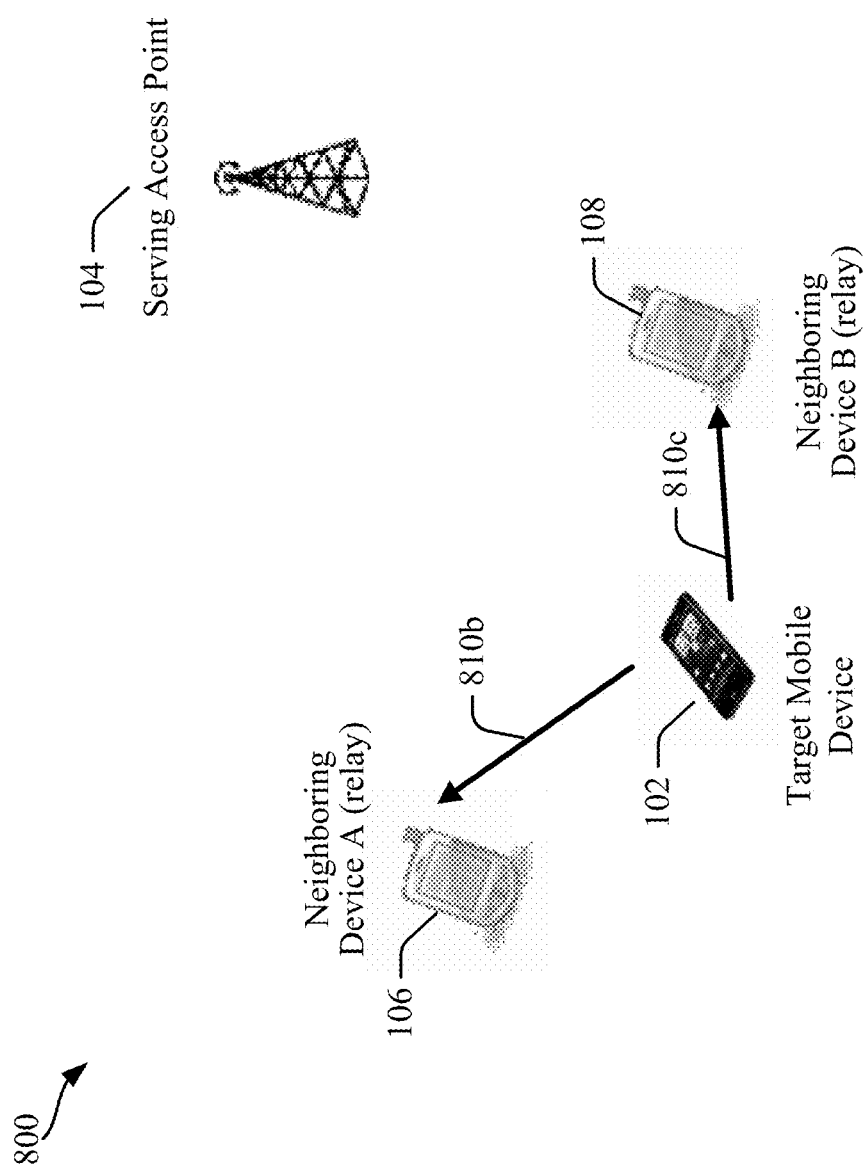
FIG. 8 illustrates a first part of a second relaying scheme where the serving access point is unaware of relaying functionality of the neighboring devices in accordance with some aspects of the disclosure.
Figure 9:
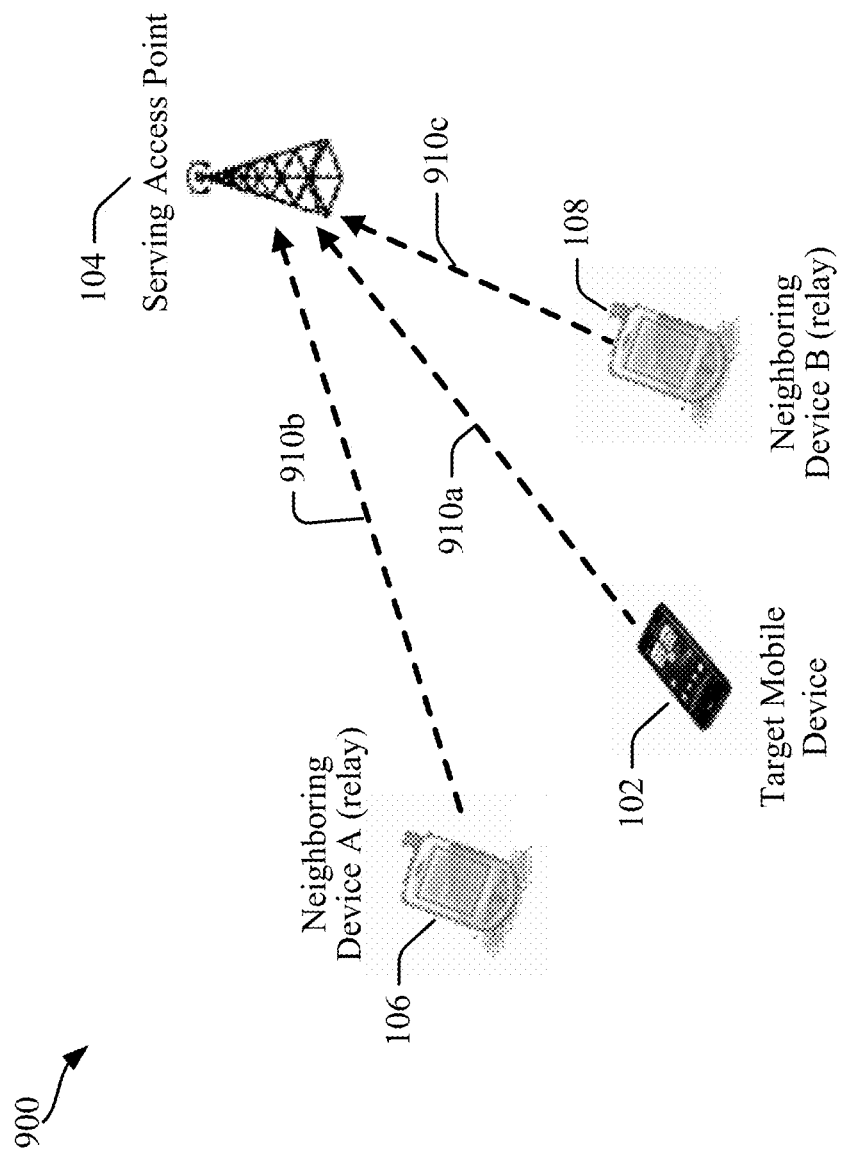
FIG. 9 illustrates a second part of a second relaying scheme where the serving access point is unaware of relaying functionality of the neighboring devices in accordance with some aspects of the disclosure.

FIGS. 8 and 9 illustrate a second relaying scheme where the serving access point 104 is unaware of the relaying functionality of the neighboring devices. As illustrated in FIG. 8, the target mobile device 102 may send, on a local device-to-device link, its transmissions 810b and 810c such that both the neighboring devices 106 and 108 receive the transmission prior to the target mobile device 102 sending it to the serving access point 104. The transmissions 810b and 810c from the target mobile device 102 may be sent only to the neighboring devices 106, 108 and not to the serving access point 104 over a shared asynchronous first channel for broadcast transmission.

Then, as illustrated in FIG. 9, the target mobile device 102 and neighboring devices 106 and 108 may simultaneously broadcast the same transmission 910a, 910b, and 910c to the serving access point 104. Accordingly, the transmissions 810b and 810c may be simultaneously broadcast from the neighboring devices 106, 108 as 910b and 910c along with a third transmission 910a from the target mobile device 102 to the serving access point 104 over the shared asynchronous first channel or a different second channel. The second transmissions 910b and 910c (and previously 810b and 810c in FIG. 8) and the third transmission 910a may be the same transmission.

Figure 10:
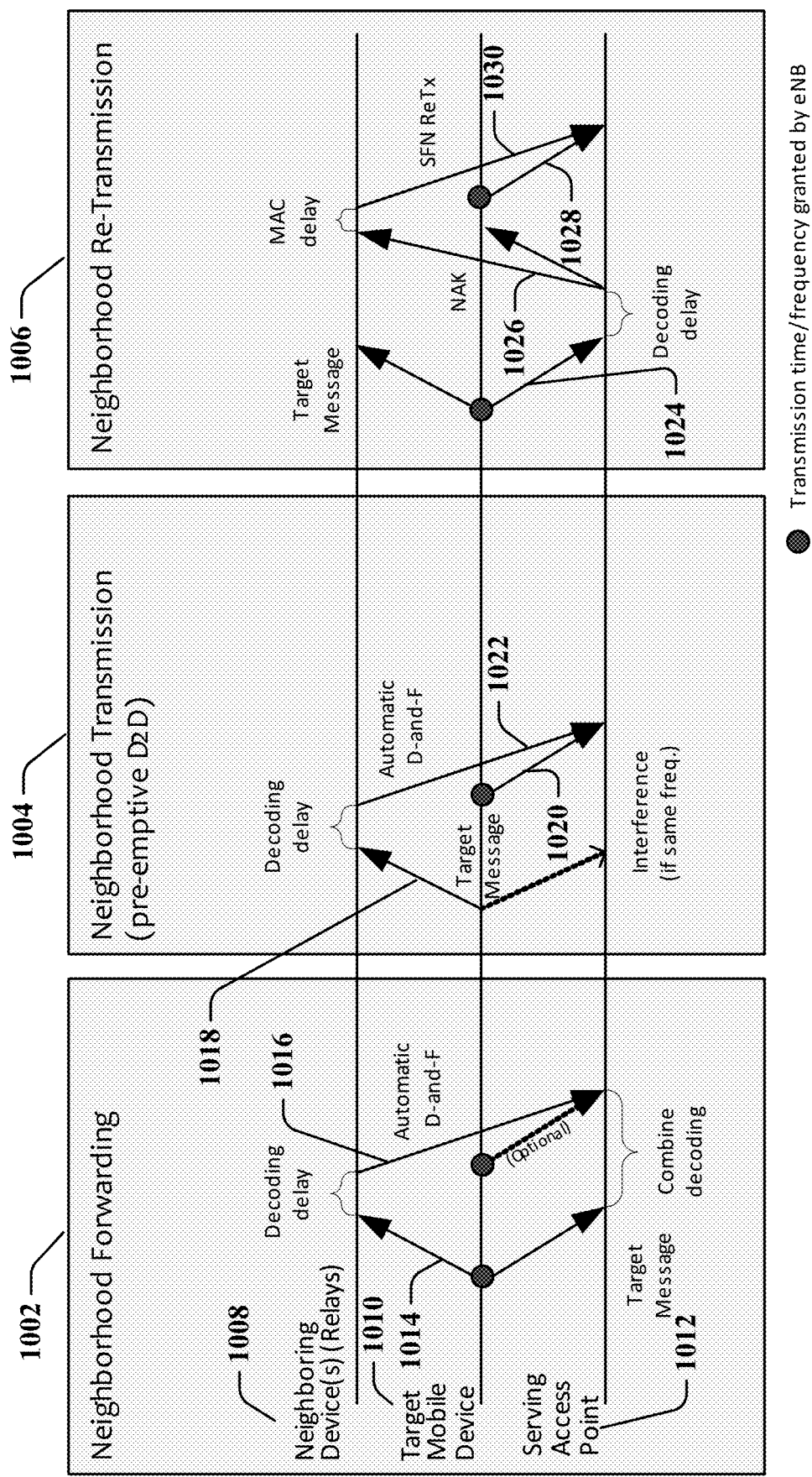
FIG. 10 illustrates three uplink relaying scenarios in accordance with some aspects of the disclosure.

FIG. 10 illustrates three uplink relaying scenarios.

In a first uplink relaying scenario 1002, the neighboring devices 1008 capture a transmission 1014 from the target mobile device 1010, decodes the transmission, and automatically forwards/relays it as transmission 1016 to the serving access point 1012 (e.g., a decode and forward operation).

In a second uplink relaying scenario 1004, the target mobile device 1010 pre-emptively sends its transmission 1018 to the neighboring devices 1008 first. Subsequently, after a decoding of the captured transmission 1018 by the neighboring devices, both the target mobile device and the neighboring devices simultaneously send their transmissions 1020, 1022 to the serving access point 1012.

In a third uplink relaying scenario 1006, the serving access point 1012 may send a failure indicator (NAK) 1026 in response to a transmission 1024 from the target mobile device 1010. The failure indicator (NAK) may be received by at least the target mobile device 1010. The failure indicator (NAK) may also be received by the neighboring devices 1008. Upon detection of the failure indicator from the serving access point 1012, the neighboring device 1008 may send the previously captured transmission 1030 concurrent or simultaneously with the retransmission 1028 from the target mobile device 1010.

Figure 11:
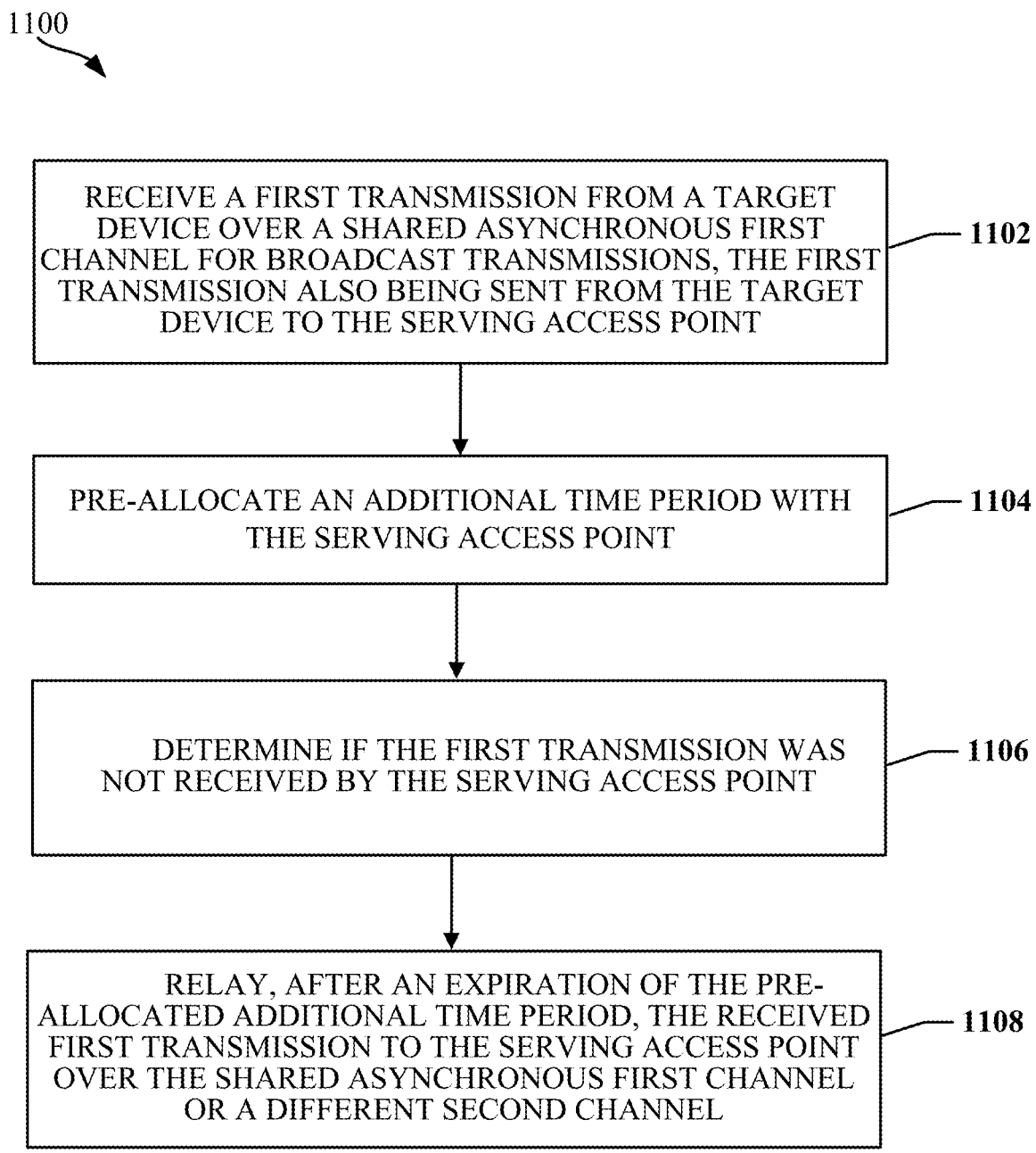
FIG. 11 illustrates an exemplary method operational on a neighboring device for uplink transmission assistance for a target device in accordance with some aspects of the disclosure.

FIG. 11 illustrates an exemplary method 1100 operational on at least one neighboring device (e.g., neighboring devices 106 and 108 of FIGS. 6-9) for uplink transmission assistance for a serving access point.

The at least one neighboring device receives a first transmission from a target device over a shared asynchronous first channel for broadcast transmissions, the first transmission also being sent from the target device to the serving access point 1102. The at least one neighboring device pre-allocates an additional time period with the serving access point 1104. The at least one neighboring device determines if the first transmission was not received by the serving access point 1106. The at least one neighboring device relays, after the expiration of the pre-allocated additional time period, the received first transmission to the serving access point over the shared asynchronous first channel or a different second channel 1108.

In one example, the method also includes the at least one neighboring device receiving a second transmission from the target device over the shared asynchronous first channel for broadcast transmissions, the second transmission not being sent to the serving access point. The method further includes simultaneously broadcasting, to the serving access point, both the received second transmission from the at least one neighboring device and a third transmission from the target device over the shared asynchronous first channel or the different second channel, the second transmission and the third transmission being the same transmission.

In another example, all devices that send transmissions use the same time and/or frequency resources to form a local single frequency network.

In yet another example, the serving access point selects the relaying of the received first transmission to be unicasted from several nearby additional devices capable of relaying transmissions.

In yet another example, the at least one neighboring device determines if the first transmission was not received by the serving access point at 1106 by determining if the serving access point sends a failure indicator (NAK) that is received by at least the target device.

In one example, the shared asynchronous first channel and the second channel are established over different non-overlapping frequency spectrums.

In another example, the shared asynchronous first channel is coextensive with the second channel.

In yet another example, the threshold period of time is synchronous with respect to reception of the first transmission.

In yet another example, the method also includes capturing and decoding the received first transmission. In yet another example, the method also includes automatically relaying the received first transmission after a decoding delay.

In yet another example, the received first transmission is relayed only if a failure indicator is received from the serving access point.

In yet another example, the received first transmission may be relayed in synchronicity with an expected retransmission from the target device.

In yet another example, the first channel uses a first frequency spectrum, a first communication protocol and/or a first modulation-and-coding scheme.

In yet another example, the method also includes receiving a message from the serving access point over the second channel indicating that a retransmission of the received first transmission is desired over the second channel, wherein the second channel uses a second frequency spectrum, a second communication protocol, and/or a second modulation-and-coding scheme, distinct from the first channel.

In yet another example, the received first transmission is relayed within an expected transmission time interval of transmissions over the first channel.

In yet another example, the first transmission is relayed regardless of channel conditions for the first channel and/or the second channel.

In yet another example, the first channel is shared for all broadcast transmissions from the target device.

Exemplary Relaying while Exploiting Timeline Differences

Figure 12:
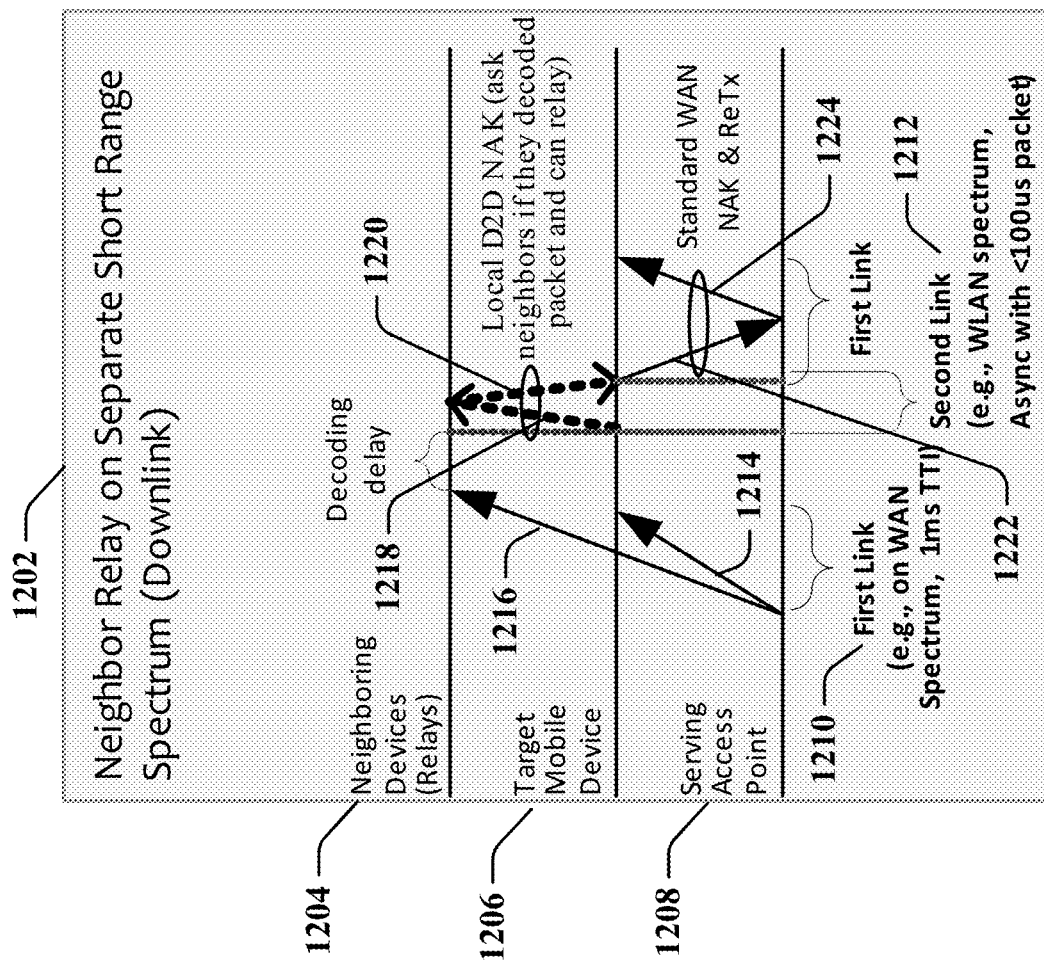
FIG. 12 illustrates a downlink assist scheme in accordance with some aspects of the disclosure.

FIG. 12 illustrates a downlink assist scheme in which relay transmissions from neighboring devices 1204 may be efficiently sought prior to requesting retransmission from a serving access point 1208. This approach takes advantage of two different links: a first link 1210 between the target mobile device 1206 and the serving access point 1208 and a second link 1212 between the target mobile device 1206 and the neighboring (relay) devices 1204. That is, the second link 1212 may use a different spectrum, protocol, and/or modulation-and-coding scheme for relaying transmissions from the neighboring devices 1204 to the target mobile device 1206 than the first link 1210 used for transmissions between the serving access point 1208 and target mobile device 1206.

A downlink relay scheme 1202 provides for the first link 1210, having a first frequency spectrum (e.g., a wide area network or WAN), first communication protocol, and/or first modulation-and-coding scheme, to be used for transmissions between the serving access point 1208 and the target mobile device 1206. The second link 1212, having a second frequency spectrum (e.g., wireless local area network or WLAN), second communication protocol and/or second modulation-and-coding scheme, may be used for relaying between the neighboring devices 1204 and the target mobile device 1206. The first link 1210 may have narrower bandwidth with longer delay relative to the second link 1212 which may have a wider bandwidth and shorter delay. In one example, the first link 1210 may be a 5G WLAN while the second link 1212, different than the first link 1210, may be a 5G WAN. In another example, the first link 1210 may be a Long Term Evolution or LTE link while the second link 1212 may be a WiFi link.

When the serving access point transmits downlink 1214 over the first link 1210 (e.g., WAN) to the target mobile device 1206, the downlink transmission 1216 is also captured by the neighboring devices 1204. If the target mobile device 1206 cannot decode the downlink transmission 1214 or detects errors in the received downlink transmission 1214, it may use the second link 1212 (e.g., WLAN) to communicate with nearby or neighboring devices 1204 to request a local retransmission 1220 before seeking a retransmission 1224 from the serving access point 1208. For instance, the target mobile device 1206 may send a local NAK message 1218 (e.g., device-to-device) over the second link 1212. This transmission may act as a request for nearby or neighboring devices 1204 receiving the NAK message 1218 to forward or relay the previous transmission 1220 intended for the target mobile device 1206 (if they received such previous transmission and were able to decode it). Upon receipt of such local NAK message 1218, any nearby or neighboring device 1204 that has captured and decoded the previous message requested by the target mobile device 1206 may relay it via the second link 1212 (e.g., WLAN).

In one example, transmissions via the second link 1212 may have a shorter transmission time interval (TTI) than the transmissions over the first link 1210. Consequently, the cooperative approach discussed herein can provide for ultra-reliable communication without burdening the network.

Additionally, transmissions over the first link 1210 between the serving access point 1208 and the target mobile device 1206 may utilize a first modulation-and-coding scheme (MCS) while relay transmissions over the second link 1212 between the neighboring device(s) 1204 and target mobile device 1206 may use a second MCS that has higher modulation and/or coding than the first MCS. Consequently, the target mobile device 1206 may be able to request and obtain a relay transmission from a neighboring device 1204 over the second link 1212 prior to the expiration of a time interval of the first link 1210 by which target mobile device 1206 needs to send a NAK message 1222 to the serving access point 1208.

If the target mobile device 1206 is able to correctly receive the relayed transmission from a neighboring device 1204 over the second link 1212, it may not need to send a NAK message 1222 to the serving access point 1208 over the first link 1210. In one example, the first link 1210 (e.g., first communication protocol) may specify a TTI of approximately 1 millisecond while the second link 1212 (e.g., second communication protocol) may be able to transmit a packet in under 100 microseconds. Therefore, relay transmissions from the nearby or neighboring devices 1204 may be sought and received using the second link 1212 within the TTI for the first link 1210. The second link 1212 may have a shorter transmission time interval (TTI) than the transmissions over the first link 1210.

This approach of using distinct types of links may be applied to all uplink and downlink transmission schemes discussed herein.

Figure 13:
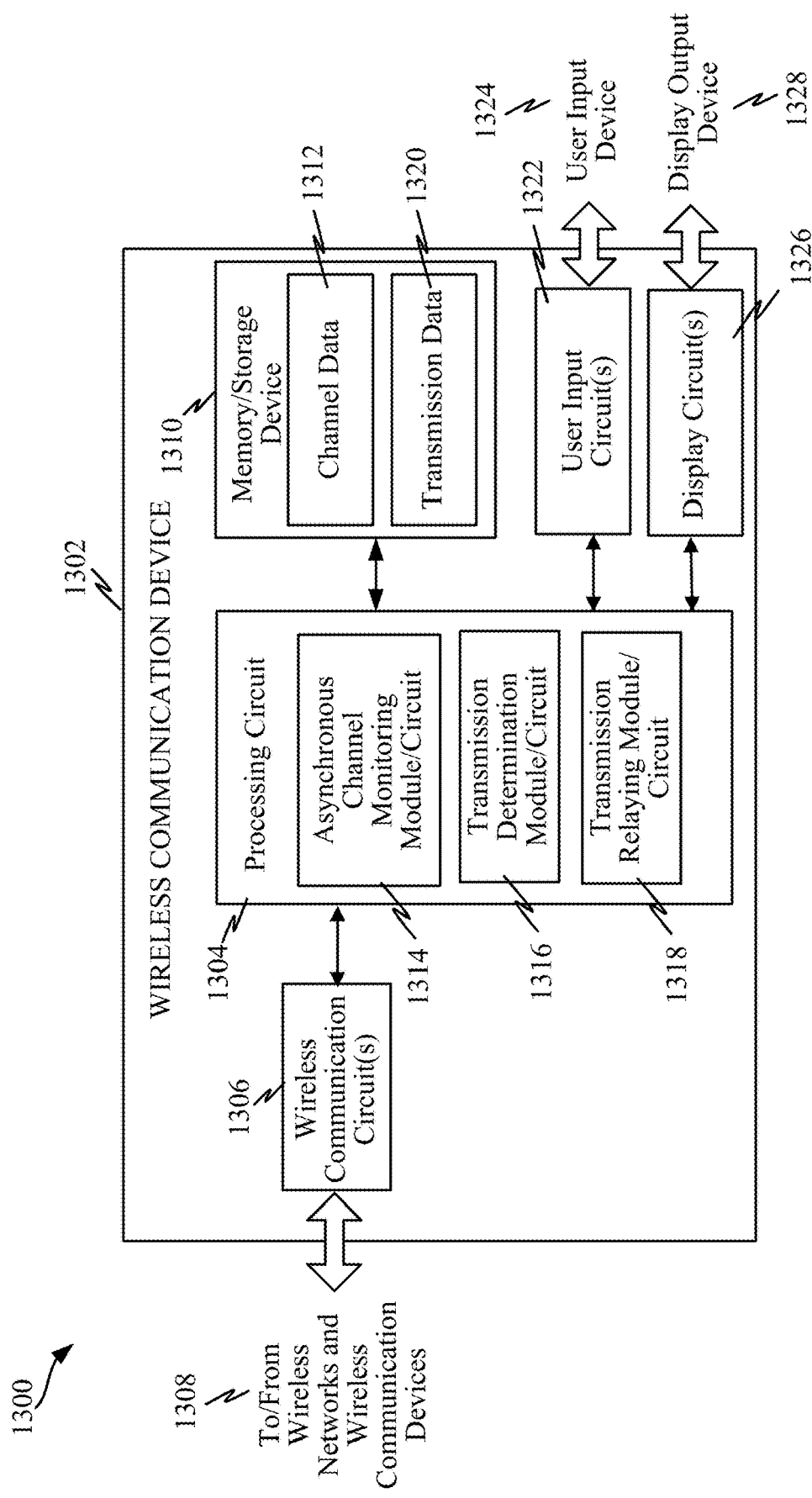
FIG. 13 is a block diagram illustrating an exemplary hardware implementation for a wireless communication device used for downlink transmission assistance in accordance with some aspects of the disclosure.

FIG. 13 is a block diagram illustrating a wireless communication device 1302. The wireless communication device 1302 may include a processing circuit 1304 coupled to a wireless communication circuit 1306, a memory/storage device 1310, a user input circuit(s) 1322 and a display circuit(s) 1326. The wireless communication circuit 1306 may facilitate wireless communications over two or more distinct wireless networks 1308 or wireless communication devices, such as the target device, other neighboring devices or the serving access point. The wireless communication device 1302 may be a mobile device, or user device, or user equipment (UE), for example.

The processing circuit 1304 may include or implement an asynchronous channel monitoring module/circuit 1314 that permits the wireless communication device 1302 to monitor a shared asynchronous first channel for broadcast transmissions from a serving access point.

The processing circuit 1304 may also include or implement a transmission analysis module/circuit 1316 that permits the wireless communication device 1302 to analyze or determine if a received first transmission over the shared asynchronous first channel is intended for a target device.

The processing circuit 1304 may also include or implement a transmission relaying module/circuit 1318 that permits the wireless communication device 1302 to relay, after the expiration of a threshold period of time, the received first transmission to the target device over the shared asynchronous first channel or a different second channel.

The wireless communication device 1302 also contains a memory/storage device 1310, which stores channel data 1312 and transmission data 1320. The channel data 1312 allows the wireless communication device 1302 to know which channel to monitor for intended transmissions and which channel to relay transmissions over. The transmission data 1320 allows the wireless communication device 1302 to know which broadcast transmissions to monitor a channel for, whether a received first transmission is intended for a target device and data necessary for relaying transmissions.

The user input circuit(s) 1322 interface with, and may be coupled to an external user input device 1324, and the display circuit(s) 1326 interface with, and may be coupled to an external display output device 1328. In addition to taking input from the user input device 1324, the user input circuit(s) 1322 may also provide output controls via an interactive display, such as a touch screen or other external hardware that the user can view. Likewise, in addition to displaying visual output in a graphical user interface (GUI) or other user interface (UI), the display circuit(s) 1326 may also provide user input options via interactive display components such as touch screens or other interactive external hardware that the user can use.

Figure 14:
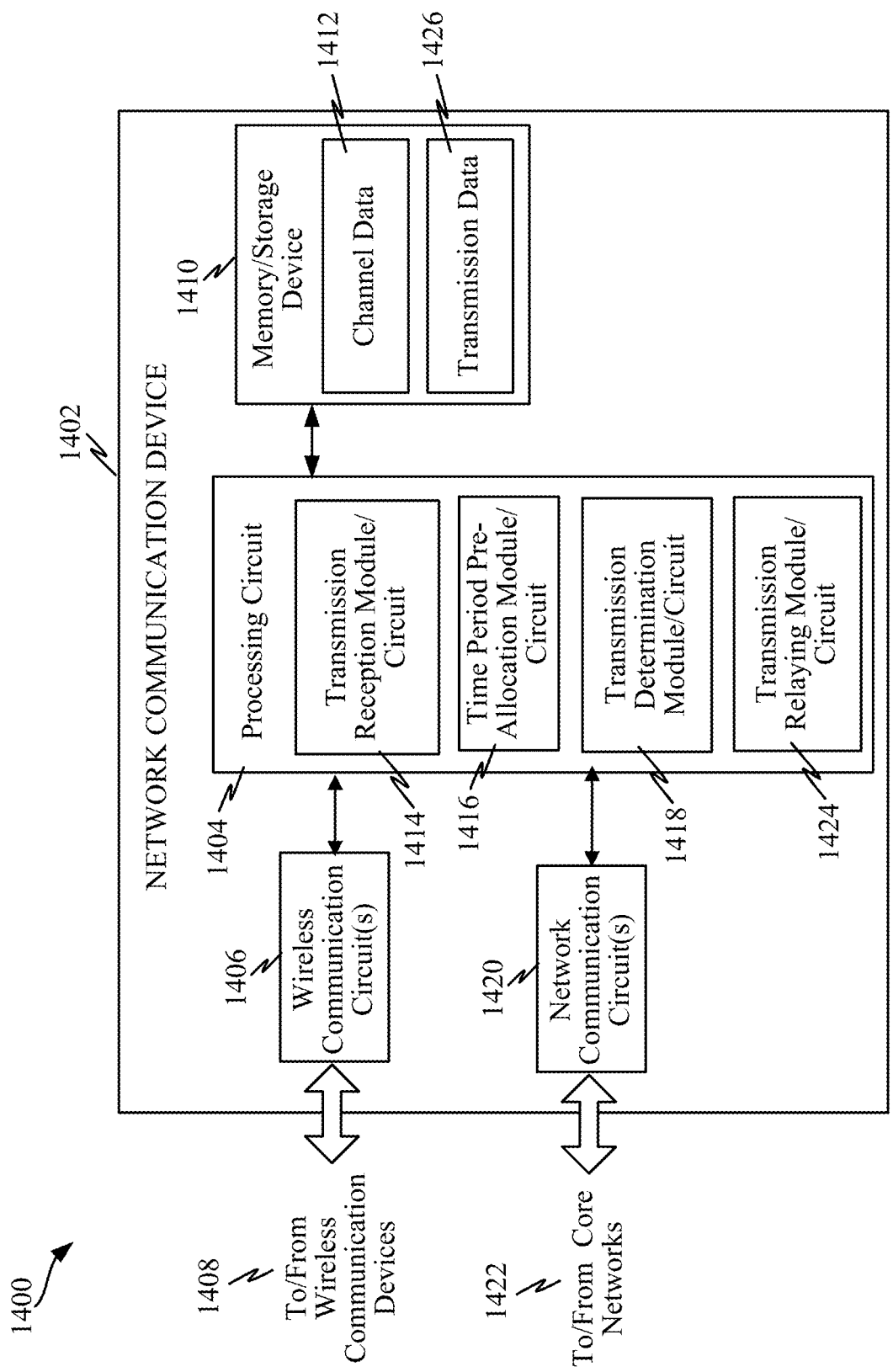
FIG. 14 is a block diagram illustrating an exemplary hardware implementation for a network communication device used for uplink transmission assistance in accordance with some aspects of the disclosure.

FIG. 14 is a block diagram illustrating a network communication device 1402. The network communication device 1402 may include a processing circuit 1404 coupled to a wireless communication circuit 1406, a network communication circuit 1420, and a memory/storage device 1410.

The wireless communication circuit 1406 may facilitate wireless communications over two or more distinct wireless networks 1408 or wireless communication devices, such as the neighboring devices, the target device or any other serving access points. The network communication circuit 1420 may facilitate data communications to and/or from at least one core network 1422. The network communication device 1402 may be a network node, an access point, or an eNB (Evolved Universal Terrestrial Radio Access Network (E-UTRAN) Node B, or evolved Node B), for example.

The processing circuit 1404 may include or implement a transmission reception module/circuit 1414 that permits the network communication device 1402 to receive a first transmission from a target device over a shared asynchronous first channel for broadcast transmissions, the first transmission also being sent from the target device to the serving access point. The first transmission reception module/circuit 1414 also permits the network communication device 1402 to receive a second transmission from the target device over the shared asynchronous first channel for broadcast transmissions, the second transmission not being sent to the serving access point.

The processing circuit 1404 may also include or implement a time period pre-allocation module/circuit 1416 that permits the network communication device 1402 to pre-allocate an additional time period with the serving access point.

The processing circuit 1404 may also include or implement a transmission analysis module/circuit 1418 that permits the network communication device 1402 to analyze or determine if the first transmission did not get received by the serving access point.

The processing circuit 1404 may also include or implement a transmission relaying module/circuit 1424 that permits the network communication device 1402 to relay, after the expiration of the pre-allocated additional time period, the received first transmission to the serving access point over the shared asynchronous first channel or a different second channel. The transmission relaying module/circuit 1424 also permits the network communication device 1402 to simultaneously broadcast, to the serving access point, both the received second transmission and a third transmission from the target device over the shared asynchronous first channel or the different second channel, the second transmission and the third transmission being the same transmission.

The network communication device 1402 also contains a memory/storage device 1410, which stores channel data 1412 and transmission data 1426. The channel data 1412 allows the network communication device 1402 to know which channel a transmission was received from. The channel data 1412 also stores necessary data about transmissions occurring over channels. The transmission data 1426 allows the network communication device 1402 to know if a transmission has been received and where that transmission was sent from. The transmission data 1426 also stores data necessary for relaying a transmission.

Figure 15:
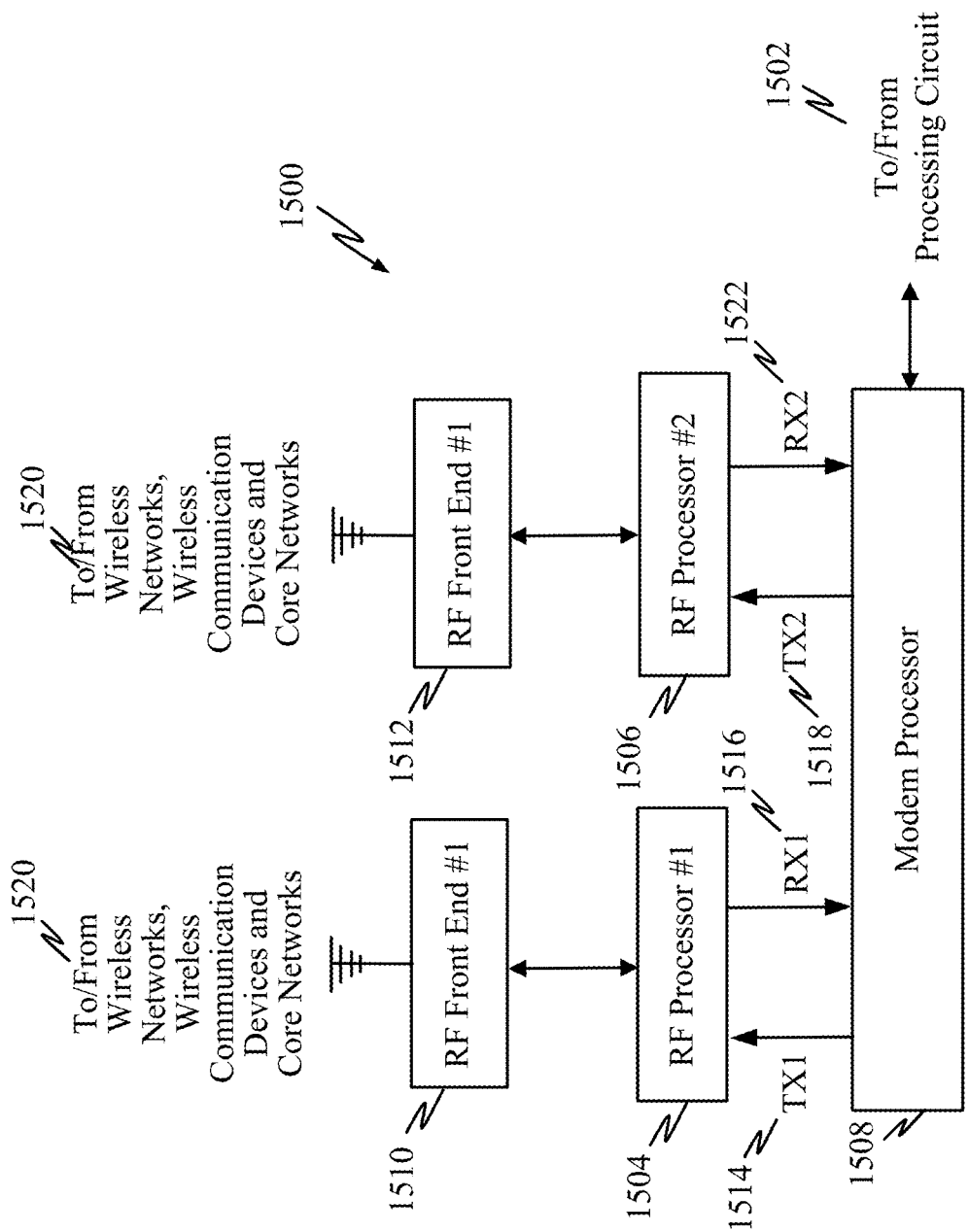
FIG. 15 is a block diagram illustrating an exemplary wireless communication circuit or network communication circuit that is used in FIGS. 13-14 in accordance with some aspects of the disclosure.

FIG. 15 is a block diagram illustrating an example of a communication circuit 1500 (e.g., wireless communication circuits 1306 and 1406 and network communication circuit 1420) of the devices 1302 and 1402 of FIGS. 13 and 14, respectively. For simplicity, even though the communication circuit represents both a wireless communication circuit and a network communication circuit, it will be referred to as the communication circuit 1500 in FIG. 15, or a combined communication circuit 1500. In the example of FIG. 15, at least one transceiver chain may be implemented. In this case, two transceiver chains that can be concurrently active are shown and implemented. A first transceiver chain may include a first radio frequency (RF) processor 1504 and a first RF front end interface 1510. A second transceiver chain may include a second RF processor 1506 and a second RF front end interface 1512. Furthermore, the first and second RF processor 1504 and 1506 may be coupled to the first RF front end interface 1510 and the second RF front end interface 1512, respectively. Both the first and second RF processors 1504 and 1506 may be coupled to a modem processor 1508. The modem processor 1508 transmits a first transmitted signal 1514 to the first RF processor 1504 and a second transmitted signal 1518 to the second RF processor 1506. The modem processor 1508 also receives a first received signal 1516 from the first RF processor 1504 and a second received signal 1522 from the second RF processor 1506. The to/from processing circuit area 1502 leads from the modem processor 1508 to the processing circuits 1304 and 1404 of the wireless communication device 1302 and the network communication device 1402 from FIGS. 13 and 14, respectively, for example. The antennae from the first RF front end interface 1510 and the second RF front end interface 1512 lead to/from wireless networks, wireless communication devices and core networks 1520.

One or more of the components, steps, features and/or functions illustrated in the FIGS. may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the FIGS. may be configured to perform one or more of the methods, features, or steps described in the FIGS. The novel algorithms described herein may also be efficiently implemented in software and/or embedded in hardware.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across a plurality of devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational on at least one neighboring device for transmission assistance for a target device, comprising:
    configuring a threshold period of time that determines a delay between transmissions to the target device, wherein the threshold period of time is operable to synchronize relaying of the transmissions by two or more devices neighboring the target device;
    receiving, from a shared asynchronous first channel, one or more transmissions by a serving access point, wherein the first channel uses a first frequency spectrum, a first communication protocol, and/or a first modulation-and-coding scheme;
    determining that the target device is an intended recipient of a received first transmission when transmitted by the serving access point over the shared asynchronous first channel;
    receiving a message from the target device over a different, second channel indicating that a retransmission of the received first transmission is desired over the second channel;
    relaying, after an expiration of the threshold period of time and responsive to the message, the received first transmission to the target device over the second channel; and
    forwarding to the serving access point, in a time slot scheduled by the serving access point, a second transmission received from the target device,
    wherein transmissions from the target device to the serving access point are scheduled by the serving access point,
    wherein the second channel uses a second frequency spectrum, a second communication protocol, and/or a second modulation-and-coding scheme, distinct from the first channel, and
    wherein the first frequency spectrum and the second frequency spectrum are non-overlapping.

2. The method of claim 1, wherein the shared asynchronous first channel and the second channel are established over different non-overlapping frequency spectrums.

3. The method of claim 1, wherein the shared asynchronous first channel is coextensive with the second channel.

4. The method of claim 1, wherein the threshold period of time is synchronous with respect to reception of the first transmission.

5. The method of claim 1, further comprising:
    capturing and decoding the received first transmission.

6. The method of claim 1, further comprising:
    automatically relaying the received first transmission after a decoding delay and the expiration of the threshold period of time.

7. The method of claim 1, wherein the received first transmission is relayed only if a failure indicator is received from the target device.

8. The method of claim 1, wherein the threshold period of time is configured so the received first transmission is relayed in synchronicity with an expected retransmission from the serving access point.

9. The method of claim 1, wherein the received first transmission is relayed within an expected transmission time interval of transmissions over the first channel.

10. The method of claim 1, wherein the first transmission is relayed regardless of channel conditions for the first channel and/or the second channel.

11. The method of claim 1, wherein the first channel is shared for all broadcast transmissions from the serving access point.

12. A wireless communication device, comprising:
a wireless communication circuit adapted for communications with at least one wireless network and other wireless devices;
a processing circuit coupled to the wireless communication circuit for communication assistance, the processing circuit configured to:
configure a threshold period of time that determines a delay between transmissions to a target device, wherein the threshold period of time is operable to synchronize relaying of the transmissions by two or more wireless devices neighboring the target device;
receive, from a shared asynchronous first channel, one or more transmissions by a serving access point, wherein the first channel uses a first frequency spectrum, a first communication protocol, and/or a first modulation-and-coding scheme;
determine that the target device is an intended recipient of a received first transmission when transmitted by the serving access point over the shared asynchronous first channel;
receive a message from the target device over a different, second channel indicating that a retransmission of the received first transmission is desired over the second channel;
relay, after an expiration of the threshold period of time and responsive to the message the received first transmission to the target device via the wireless communication circuit and over the second channel; and
forward to the serving access point in a time slot scheduled by the serving access point, a second transmission received from the target device,
wherein transmissions from the target device to the serving access point are scheduled by the serving access point,
wherein the second channel uses a second frequency spectrum, a second communication protocol, and/or a second modulation-and-coding scheme, distinct from the first channel, and
wherein the first frequency spectrum and the second frequency spectrum are non-overlapping.

13. The wireless communication device of claim 12 further comprising:
a storage device including channel data and transmission data.

14. The wireless communication device of claim 12 further comprising:
a user input circuit coupled to an external user input device; and
a display circuit coupled to an external display output device.

15. The wireless communication device of claim 14, wherein the user input circuit takes input and also provides output via the external user input device and the display circuit displays output and provides input via the external display output device.

16. The wireless communication device of claim 12, wherein the wireless communication circuit comprises:
at least one transceiver chain; and
a modem processor coupled to the processing circuit.

17. The wireless communication device of claim 16, wherein the at least one transceiver chain comprises:
a first transceiver chain including a first radio frequency (RF) front end interface and a first RF processor, the first RF front end interface being coupled to the first RF processor; and
a second transceiver chain including a second RF front end interface and a second RF processor, the second RF front end interface being coupled to the second RF processor, the first and second RF front end interfaces communicating with the at least one wireless network and the other wireless devices.

18. The wireless communication device of claim 17, wherein the modem processor sends a first transmitted signal to the first RF processor and a second transmitted signal to the second RF processor, and also receives a first received signal from the first RF processor and a second received signal from the second RF processor.

19. An apparatus operational on at least one neighboring device for transmission assistance for a target device, comprising:
means for receiving, from a shared asynchronous first channel, one or more transmissions by a serving access point, wherein the first channel uses a first frequency spectrum, a first communication protocol, and/or a first modulation-and-coding scheme;
means for determining whether the target device is an intended recipient of a received first transmission when transmitted by the serving access point over the shared asynchronous first channel;
means for receiving a message from the target device over a different, second channel indicating that a retransmission of the received first transmission is desired over the second channel;
means for relaying the received first transmission to the target device over the shared asynchronous first channel or the second channel, wherein the means for relaying is configured to relay the received first transmission over the second channel to the target device in response to the message and after expiration of a threshold period of time; and
means for forwarding to the serving access point in a time slot scheduled by the serving access point, a second transmission received from the target device, wherein transmissions from the target device to the serving access point are scheduled by the serving access point,
wherein the second channel uses a second frequency spectrum, a second communication protocol, and/or a second modulation-and-coding scheme, distinct from the first channel,
wherein the first frequency spectrum and the second frequency spectrum are non-overlapping,
wherein the threshold period of time is pre-allocated by the serving access point and is operable to synchronize relaying of the transmissions by two or more devices neighboring the target device, and
wherein the threshold period of time determines a delay provided between the first transmission and relaying of the received first transmission to the target device.

20. The apparatus of claim 19, wherein the shared asynchronous first channel and the second channel are established over different non-overlapping frequency spectrums.

21. The apparatus of claim 19, wherein the shared asynchronous first channel is coextensive with the second channel.

22. The apparatus of claim 19, wherein the threshold period of time is synchronous with respect to reception of the first transmission.

23. The apparatus of claim 19, further comprising:
means for capturing and decoding the received first transmission.

24. The apparatus of claim 19, further comprising:
means for automatically relaying the received first transmission after a decoding delay and the expiration of the threshold period of time.

25. The apparatus of claim 19, wherein the received first transmission is relayed only if a failure indicator is received from the target device.

26. The apparatus of claim 19, wherein the threshold period of time is configured so the received first transmission is relayed in synchronicity with an expected retransmission from the serving access point.

27. The apparatus of claim 19, wherein the received first transmission is relayed within an expected transmission time interval of transmissions over the first channel.

28. The apparatus of claim 19, wherein the first transmission is relayed regardless of channel conditions for the first channel and/or the second channel.

29. The apparatus of claim 19, wherein the first channel is shared for all broadcast transmissions from the serving access point.

30. A non-transitory computer-readable storage medium having instructions stored thereon operational on at least one neighboring device for transmission assistance for a target device, the instructions which when executed by at least one processor cause the processor to:
configure a threshold period of time that determines a delay between transmissions to the target device, wherein the threshold period of time is operable to synchronize relaying of the transmissions by two or more devices neighboring the target device;
receive, from a shared asynchronous first channel, one or more transmissions by a serving access point, wherein the first channel uses a first frequency spectrum, a first communication protocol, and/or a first modulation-and-coding scheme;
determine that the target device is an intended recipient of a received first transmission when transmitted by the serving access point over the shared asynchronous first channel;
receive a message from the target device over a different, second channel indicating that a retransmission of the received first transmission is desired over the second channel;
after an expiration of the threshold period of time and responsive to the message, relay the received first transmission to the target device over the shared asynchronous first channel or the second channel; and
forward to the serving access point at a time scheduled by the serving access point, a second transmission received from the target device,
wherein transmissions from the target device to the serving access point are scheduled by the serving access point,
wherein the second channel uses a second frequency spectrum, a second communication protocol, and/or a second modulation-and-coding scheme, distinct from the first channel, and
wherein the first frequency spectrum and the second frequency spectrum are non-overlapping.

31. The non-transitory computer-readable storage medium of claim 30, wherein the shared asynchronous first channel and the second channel are established over different non-overlapping frequency spectrums.

32. The non-transitory computer-readable storage medium of claim 30, wherein the shared asynchronous first channel is coextensive with the second channel.

33. The non-transitory computer-readable storage medium of claim 30, wherein the threshold period of time is synchronous with respect to reception of the first transmission.

34. The non-transitory computer-readable storage medium of claim 30, wherein the instructions which when executed by the at least one processor further causes the processor to:
capture and decode the received first transmission.

35. The non-transitory computer-readable storage medium of claim 30, wherein the instructions further cause the processor to:
automatically relay the received first transmission after a decoding delay and the expiration of the threshold period of time.

36. The non-transitory computer-readable storage medium of claim 30, wherein the received first transmission is relayed only if a failure indicator is received from the target device.

37. The non-transitory computer-readable storage medium of claim 30, wherein the threshold period of time is configured so the received first transmission is relayed in synchronicity with an expected retransmission from the serving access point.

38. The non-transitory computer-readable storage medium of claim 30, wherein the received first transmission is relayed within an expected transmission time interval of transmissions over the first channel.

39. The non-transitory computer-readable storage medium of claim 30, wherein the first transmission is relayed regardless of channel conditions for the first channel and/or the second channel.

40. The non-transitory computer-readable storage medium of claim 30, wherein the first channel is shared for all broadcast transmissions from the serving access point.

41. A method operational on at least one neighboring device for transmission assistance for a serving access point, comprising:
forwarding, after an expiration of a threshold period of time defined by the serving access point, a downlink transmission sent from the serving access point and intended for a target device over a shared asynchronous first channel for broadcast transmissions or a different second channel, wherein the threshold period of time is operable to synchronize relaying of the transmissions by two or more devices neighboring the target device;
receiving a first transmission from the target device over the shared asynchronous first channel, the first transmission also being sent from the target device to the serving access point, wherein the first channel uses a first frequency spectrum, a first communication protocol, and/or a first modulation-and-coding scheme;
pre-allocating a time period with the serving access point, wherein transmissions from the target device to the serving access point and from the serving access point to the target device are scheduled by the serving access point;
determining that the first transmission was not received by the serving access point, including when a message received from the serving access point indicates that a retransmission of the received first transmission by the at least one neighboring device is desired;

waiting until a pre-allocated time period has expired after determining that the first transmission was not received by the serving access point; and relaying, after expiration of the pre-allocated time period and responsive to the message, the received first transmission to the serving access point over the second channel, wherein the second channel uses a second frequency spectrum, a second communication protocol, and/or a second modulation-and-coding scheme, distinct from the first channel, and wherein the first frequency spectrum and the second frequency spectrum are non-overlapping.

42. The method of claim 41, further comprising:

receiving a second transmission from the target device over the shared asynchronous first channel, the second transmission not being sent to the serving access point; and simultaneously broadcasting, to the serving access point, both the received second transmission and a third transmission from the target device over the shared asynchronous first channel or the different second channel, the second transmission and the third transmission being the same transmission.

43. The method of claim 41, wherein all devices that send transmissions use the same time and/or frequency resources to form a local single frequency network.

44. The method of claim 41, wherein the serving access point selects the relaying of the received first transmission to be unicasted from several nearby additional devices capable of relaying transmissions.

45. The method of claim 41, wherein determining if the first transmission was not received by the serving access point comprises determining if the serving access point sends a failure indicator (NAK) that is received by at least the target device.

46. A network communication device, comprising:

a wireless communication circuit adapted for communications with at least one wireless network and other wireless devices;

a network communication circuit adapted for communications with at least one core network;

a processing circuit coupled to the wireless communication circuit for communication assistance, the processing circuit configured to:

forward, after an expiration of a threshold period of time defined by a serving access point, a downlink transmission sent from the serving access point and intended for a target device over a shared asynchronous first channel for broadcast transmissions or a different second channel, wherein the threshold period of time is operable to synchronize relaying of the transmissions by two or more devices neighboring the target device;

receive a first transmission from the target device over the shared asynchronous first channel, the first transmission also being sent from the target device to the serving access point, wherein the first channel uses a first frequency spectrum, a first communication protocol, and/or a first modulation-and-coding scheme;

pre-allocate a time period with the serving access point, wherein transmissions from the target device to the serving access point and from the serving access point to the target device are scheduled by the serving access point;

determine if the first transmission was not received by the serving access point, including when a message received from the serving access point indicates that a retransmission of the received first transmission by the network communication device is desired;

wait until a pre-allocated time period has expired after determining that the first transmission was not received by the serving access point; and relay, after expiration of the pre-allocated time period and responsive to the message, the received first transmission to the serving access point over the second channel, wherein the second channel uses a second frequency spectrum, a second communication protocol, and/or a second modulation-and-coding scheme, distinct from the first channel, and wherein the first frequency spectrum and the second frequency spectrum are non-overlapping.

47. The network communication device of claim 46, wherein the network communication circuit and the wireless communication circuit form a combined communication circuit.

48. The network communication device of claim 47, wherein the combined communication circuit comprises:

at least one transceiver chain; and a modem processor coupled to the processing circuit.

49. The network communication device of claim 48, wherein the at least one transceiver chain comprises:

a first transceiver chain including a first radio frequency (RF) front end interface and a first RF processor, the first RF front end interface being coupled to the first RF processor; and a second transceiver chain including a second RF front end interface and a second RF processor, the second RF front end interface being coupled to the second RF processor, the first and second RF front end interfaces communicating with the at least one core network, the at least one wireless network and/or the other wireless devices.

50. The network communication device of claim 49, wherein the modem processor sends a first transmitted signal to the first RF processor and a second transmitted signal to the second RF processor, and also receives a first received signal from the first RF processor and a second received signal from the second RF processor.

51. An apparatus operational on at least one neighboring device for transmission assistance for a serving access point, comprising:

means for forwarding, after an expiration of a threshold period of time defined by the serving access point, a downlink transmission sent from the serving access point and intended for a target device over a shared asynchronous first channel for broadcast transmissions or a different second channel, wherein the threshold period of time is operable to synchronize relaying of the transmissions by two or more devices neighboring the target device;

means for receiving a first transmission from the target device over the shared asynchronous first channel, the first transmission also being sent from the target device to the serving access point, wherein the first channel uses a first frequency spectrum, a first communication protocol, and/or a first modulation-and-coding scheme;

means for pre-allocating a time period with the serving access point, wherein transmissions from the target device to the serving access point and from the serving access point to the target device are scheduled by the serving access point;

means for determining if the first transmission was not received by the serving access point, including when the means for determining if the first transmission was not received receives a message from the serving access point indicating that a retransmission of the first transmission by the at least one neighboring device is desired; and means for relaying the received first transmission to the serving access point over the second channel, wherein the second channel uses a second frequency spectrum, a second communication protocol, and/or a second modulation-and-coding scheme, distinct from the first channel, wherein the first frequency spectrum and the second frequency spectrum are non-overlapping, and wherein the means for relaying is configured to relay the first transmission after determining that the first transmission was not received by the serving access point and after waiting until the pre-allocated time period has expired.

52. The apparatus of claim 51, further comprising:

means for receiving a second transmission from the target device over the shared asynchronous first channel, the second transmission not being sent to the serving access point; and means for simultaneously broadcasting, to the serving access point, both the received second transmission and a third transmission from the target device over the shared asynchronous first channel or the different second channel, the second transmission and the third transmission being the same transmission.

53. The apparatus of claim 51, wherein all devices that send transmissions use the same time and/or frequency resources to form a local single frequency network.

54. The apparatus of claim 51, wherein the serving access point selects the relaying of the received first transmission to be unicasted from several nearby additional devices capable of relaying transmissions.

55. The apparatus of claim 51, wherein the means for determining if the first transmission was not received by the serving access point comprises means for determining if the serving access point sends a failure indicator (NAK) that is received by at least the target device.

56. A non-transitory computer-readable storage medium having instructions stored thereon operational on at least one neighboring device for transmission assistance for a serving access point, the instructions which when executed by at least one processor cause the processor to:

forward, after an expiration of a threshold period of time defined by the serving access point, a downlink transmission sent from the serving access point and intended for a target device over a shared asynchronous first channel for broadcast transmissions or a different second channel, wherein the threshold period of time is operable to synchronize relaying of the transmissions by two or more devices neighboring the target device;

receive a first transmission from the target device over the shared asynchronous first channel, the first transmission also being sent from the target device to a serving access point, wherein the first channel uses a first frequency spectrum, a first communication protocol, and/or a first modulation-and-coding scheme;

pre-allocate a time period with the serving access point, wherein transmissions from the target device to the serving access point and from the serving access point to the target device are scheduled by the serving access point;

determine if the first transmission was not received by the serving access point, including when a message received from the serving access point indicates that a retransmission of the received first transmission by the at least one neighboring device is desired;

wait until a pre-allocated time period has expired after determining that the first transmission was not received by the serving access point; and relay, after an expiration of the pre-allocated time period and responsive to the message, the received first transmission to the serving access point over the second channel, wherein the second channel uses a second frequency spectrum, a second communication protocol, and/or a second modulation-and-coding scheme, distinct from the first channel, and wherein the first frequency spectrum and the second frequency spectrum are non-overlapping.

57. The non-transitory computer-readable storage medium of claim 56, wherein the instructions which when executed by the at least one processor further causes the processor to:

receive a second transmission from the target device over the shared asynchronous first channel, the second transmission not being sent to the serving access point; and simultaneously broadcast, to the serving access point, both the received second transmission and a third transmission from the target device over the shared asynchronous first channel or the different second channel, the second transmission and the third transmission being the same transmission.

58. The non-transitory computer-readable storage medium of claim 56, wherein all devices that send transmissions use the same time and/or frequency resources to form a local single frequency network.

59. The non-transitory computer-readable storage medium of claim 56, wherein the serving access point selects the relaying of the received first transmission to be unicasted from several nearby additional devices capable of relaying transmissions.

60. The non-transitory computer-readable storage medium of claim 56, wherein determining if the first transmission was not received by the serving access point comprises determining if the serving access point sends a failure indicator (NAK) that is received by at least the target device.

\* \* \* \* \*